United States Patent
Pulsipher

(10) Patent No.: US 8,244,854 B1
(45) Date of Patent: Aug. 14, 2012

(54) METHOD AND SYSTEM FOR GATHERING AND PROPAGATING STATISTICAL INFORMATION IN A DISTRIBUTED COMPUTING ENVIRONMENT

(75) Inventor: Darren W. Pulsipher, Alpine, UT (US)

(73) Assignee: Cadence Design Systems, Inc., San Jose, CA (US)

( * ) Notice: Subject to any disclaimer, the term of this patent is extended or adjusted under 35 U.S.C. 154(b) by 1677 days.

(21) Appl. No.: 11/297,268

(22) Filed: Dec. 8, 2005

Related U.S. Application Data

(60) Provisional application No. 60/634,455, filed on Dec. 8, 2004, provisional application No. 60/634,453, filed on Dec. 8, 2004, provisional application No. 60/634,481, filed on Dec. 8, 2004.

(51) Int. Cl.
G06F 15/16 (2006.01)
G06F 15/173 (2006.01)

(52) U.S. Cl. ........... 709/224; 709/201

(58) Field of Classification Search ......... 709/201–205, 709/229, 223, 224
See application file for complete search history.

(56) References Cited

U.S. PATENT DOCUMENTS

| | | | |
|---|---|---|---|
| 4,825,354 A | 4/1989 | Agrawal et al. |
| 5,319,758 A | 6/1994 | Arai et al. |
| 5,381,534 A | 1/1995 | Shi |
| 5,459,871 A | 10/1995 | Van Den Berg |
| 5,802,291 A | 9/1998 | Balick et al. |
| 5,832,484 A | 11/1998 | Sankaran et al. |
| 5,903,891 A | 5/1999 | Chen et al. |
| 6,009,266 A | 12/1999 | Brownell et al. |
| 6,182,154 B1 | 1/2001 | Campagnoni et al. |
| 6,182,158 B1 | 1/2001 | Kougiouris et al. |
| 6,223,200 B1 | 4/2001 | Barnes et al. |
| 6,226,618 B1 | 5/2001 | Downs et al. |
| 6,247,041 B1 | 6/2001 | Krueger et al. |
| 6,269,373 B1 | 7/2001 | Apte et al. |
| 6,321,264 B1 | 11/2001 | Fletcher et al. |
| 6,378,066 B1 | 4/2002 | Lewis |
| 6,418,484 B1 | 7/2002 | Radia |
| 6,438,616 B1 | 8/2002 | Callsen et al. |
| 6,505,210 B1 | 1/2003 | Frey et al. |
| 6,594,671 B1 | 7/2003 | Arman et al. |
| 6,651,047 B1 | 11/2003 | Weschler, Jr. |
| 6,678,714 B1 | 1/2004 | Olapurath et al. |
| 6,681,242 B1 | 1/2004 | Kumar et al. |
| 6,704,806 B1 | 3/2004 | Decker |
| 6,772,216 B1 | 8/2004 | Ankireddipally et al. |
| 6,792,606 B2 | 9/2004 | Halter et al. |

(Continued)

OTHER PUBLICATIONS

Final Office Action dated Jul. 21, 2009 for U.S. Appl. No. 11/297,621.

(Continued)

*Primary Examiner* — Aaron Strange
(74) *Attorney, Agent, or Firm* — Vista IP Law Group, LLP

(57) ABSTRACT

Method and system for gathering and propagating statistical information about resources in a distributed computing grid. Data relating to a resource in the first group of resources on the distributed computing grid is received by a gatherer. The received data is provided to other resources in the first group, and a statistical model is determined or generated for each resource in the first group based on the received data. A second group of resources on the grid is called, and the statistical information from the first group is propagated to the second group.

41 Claims, 28 Drawing Sheets

U.S. PATENT DOCUMENTS

| | | | |
|---|---|---|---|
| 6,804,714 B1 * | 10/2004 | Tummalapalli | 709/224 |
| 6,961,716 B2 | 11/2005 | Rhodes | |
| 6,993,771 B1 | 1/2006 | Hasha et al. | |
| 7,039,695 B1 * | 5/2006 | DeLuca et al. | 709/223 |
| 7,043,731 B2 | 5/2006 | Ramaswamy | |
| 7,051,098 B2 | 5/2006 | Masters et al. | |
| 7,184,967 B1 | 2/2007 | Mital et al. | |
| 7,379,994 B2 * | 5/2008 | Collazo | 709/224 |
| 7,506,046 B2 | 3/2009 | Rhodes | |
| 7,571,181 B2 | 8/2009 | Rhodes | |
| 7,584,474 B2 | 9/2009 | Gondi et al. | |
| 2002/0099821 A1 | 7/2002 | Hellerstein et al. | |
| 2002/0116205 A1 | 8/2002 | Ankireddipally et al. | |
| 2003/0037136 A1 * | 2/2003 | Labovitz et al. | 709/224 |
| 2003/0088708 A1 | 5/2003 | Lewallen | |
| 2003/0100957 A1 | 5/2003 | Chaffee et al. | |
| 2003/0120701 A1 | 6/2003 | Pulsipher et al. | |
| 2003/0120708 A1 | 6/2003 | Pulsipher et al. | |
| 2003/0120709 A1 | 6/2003 | Pulsipher et al. | |
| 2003/0120710 A1 | 6/2003 | Pulsipher et al. | |
| 2003/0120764 A1 | 6/2003 | Laye et al. | |
| 2003/0187826 A1 | 10/2003 | Kennedy et al. | |
| 2004/0019898 A1 | 1/2004 | Frey et al. | |
| 2004/0025163 A1 | 2/2004 | Babutzka et al. | |
| 2004/0078105 A1 | 4/2004 | Moon et al. | |
| 2005/0188088 A1 * | 8/2005 | Fellenstein et al. | 709/226 |
| 2005/0198247 A1 | 9/2005 | Perry et al. | |
| 2005/0240668 A1 * | 10/2005 | Rolia et al. | 709/223 |
| 2005/0283786 A1 | 12/2005 | Dettinger et al. | |
| 2006/0048157 A1 * | 3/2006 | Dawson et al. | 718/104 |

OTHER PUBLICATIONS

Non-Final Office Action dated Nov. 10, 2009 for U.S. Appl. No. 11/297,604.
Non-Final Office Action dated Nov. 12, 2009 for U.S. Appl. No. 11/297,621.
Non Final Office Action dated Apr. 2, 2008 for U.S. Appl. No. 11/297,621.
Final Office Action dated Oct. 21, 2008 for U.S. Appl. No. 11/297,621.
Non Final Office Action dated Mar. 16, 2009 for U.S. Appl. No. 11/297,621.
L. Ferriera, et al., "Introduction to Grid Computing With Globus", *IBM Redbooks*, Sep. 2003.
Final Office Action dated Apr. 12, 2010 for U.S. Appl. No. 11/297,621.
Non-Final Office Action dated Mar. 24, 2010 for U.S. Appl. No. 11/297,562.
Non-Final Office Action dated Mar. 4, 2010 for U.S. Appl. No. 11/297,609.
Non-Final Office Action dated May 3, 2011 for U.S. Appl. No. 11/297,604.
Notice of Allowance dated Mar. 4, 2011 for U.S. Appl. No. 11/297,609.
Final Office Action dated Jun. 8, 2010 for U.S. Appl. No. 11/297,604.
Final Office Action Date Aug. 13, 2010 for U.S. Appl. No. 11/297,609.
Final Office Action dated Aug. 16, 2010 for U.S. Appl. No. 11/297,562.
Non-Final Office Action dated Aug. 3, 2010 for U.S. Appl. No. 11/297,621.
Non-Final Office Action dated Nov. 16, 2010 for U.S. Appl. No. 11/297,609.
Final Office Action dated Nov. 23, 2010 for U.S. Appl. No. 11/297,621.
Non-Final Office Action dated Apr. 24, 2012 for U.S. App. No. 11/297,562.

* cited by examiner

Work Inheritance

Work States

Work States

TASK STATES

| Name | | | Time | |
|---|---|---|---|---|
| 1 | | BuildCycle(B01) | Finishes when all sub-work is finished | |
| 1.1 | | Build3rdParty(B01) | Note: Finishes after 1.1.1 and 1.1.2 | |
| 1.1.1 | | Build3rdPartyTool(B01, "1") | Finishes after 1.1.1.1 | |
| | 1.1.1.1 | make tool1 | | |
| 1.1.2 | | Build3rdPartyTool(B01, "2") | Finishes after 1.1.2.1 | |
| | 1.1.2.1 | make tool2 | | |
| | 1.2 | preBuild.pl B01 | Start after 1.1 | |
| 1.3 | | BuildComponent(B01, "1") | Start after 1.2 | Finish after 1.3.3 |
| | 1.3.1 | premake.pl component 1 | | |
| | 1.3.2 | make component 1 | Start after 1.3.1 | |
| | 1.3.3 | postmake.pl component 1 | Start after 1.3.2 | |
| 1.4 | | BuildComponent(B01, "2") | Start after 1.2 | Finish after 1.4.3 |
| | 1.4.1 | premake.pl component 2 | | |
| | 1.4.2 | make component 2 | Start after 1.4.1 | |
| | 1.4.3 | postmake.pl component 2 | Start after 1.4.2 | |
| 1.5 | | BuildComponent(B01, "3") | Start after 1.2 | Finish after 1.5.3 |
| | 1.5.1 | premake.pl component 3 | | |
| | 1.5.2 | make component 3 | Start after 1.5.1 | |
| | 1.5.3 | postmake.pl component 3 | Start after 1.5.2 | |
| | 1.6 | postMake.pl B01 | Start after 1.3, 1.4, and 1.5 | |

TASK TIMING

Fig. 4F

Table 2-1 Timing Chart

Legend (column markers in Time): Created, Pending, Blocked, Active, Completed

| Name | | Time |
|---|---|---|
| 1 | BuildCycle(B01) | |
| 1.1 | GatherCode(B01) | Finishes after 1.1.1 and 1.1.2 |
| 1.1.1 | MergeCode (B01) | |
| 1.1.2 | Get3rdParty (B01) | |
| 1.2 | BuildComponent (B01, "1") | Start after 1.1    Finishes after 1.2 * |
| 1.2.1 | BuildProduct (B01) | Start w/Parent |
| 1.2.2 | BuildComponent (B01, "1") | Start w/Parent |
| 1.2.3 | BuildComponent (B01, "2") | Start w/Parent |
| 1.2.4 | BuildComponent (B01, "3") | Start w/Parent |
| 1.3 | TestProduct (B01) | Starts when 1.2 is finished    Finishes after 1.3 |
| 1.3.1 | TestComponents (B01) | Start with 1.3 |
| 1.3.1.1 | TestComponent (B01, "1") | Start with 1.3.1    Finishes after 1.3.1 * |
| 1.3.1.2 | TestComponent (B01, "2") | Start with 1.3.1 |
| 1.3.1.3 | TestComponent (B01, "3") | Start with 1.3.1 |
| 1.3.2 | TestSystemIntegration (B01) | Start with 1.3.1 |
| 1.3.3 | TestSystemFlow (B01) | Start with 1.3.1 |
| 1.4 | PackageProduct (B01) | Start after 1.3 |
| 1.4.1 | Gather3rdParty (B01) | |
| 1.4.2 | GatherBinaries (B01) | |
| 1.4.3 | CreateInstallation (B01) | |
| 1.4.4 | CreatePackage (B01) | |

JOB TIMING

Fig. 4H

METHOD AND SYSTEM FOR GATHERING AND PROPAGATING STATISTICAL INFORMATION IN A DISTRIBUTED COMPUTING ENVIRONMENT

CROSS REFERENCE TO RELATED APPLICATIONS

This application claims priority under 35 U.S.C. §119 of U.S. Provisional Application No. 60/634,455, filed Dec. 8, 2004, entitled "Method and Apparatus for Gathering Resource Information," the contents of which are incorporated herein by reference.

This application claims priority under 35 U.S.C. §119 of U.S. Provisional Application No. 60/634,453, filed Dec. 8, 2004, entitled "Method and Apparatus for Propagating Hierarchical Statistical Data," the contents of which are incorporated herein by reference.

This application claims priority under 35 U.S.C. §119 of U.S. Provisional Application No. 60/634,481, filed Dec. 8, 2004, entitled "Method and Apparatus for Operation of Distributed Computing Systems," the contents of which are incorporated herein by reference.

This application is also related to co-pending U.S. application Ser. Nos. 10/247,970, 10/251,230, 10/251,019, and 10/251,747, all of which were filed on Sep. 19, 2002, and U.S. Provisional Application Ser. No. 60/342,630, filed on Dec. 20, 2001, all of which are incorporated herein by reference.

FIELD OF THE INVENTION

The present invention relates generally to distributed computing system and, more particularly, to gathering, modeling, and propagating information relating to resources within a distributed computing system.

BACKGROUND

Distributed or grid computing provides the ability to share and allocate processing requests and resources among various nodes, computers or server farm(s) within a grid. A server farm is generally a group of networked servers or, alternatively, a networked multi-processor computing environment, in which work is distributed between multiple processors. Workload is distributed between individual components or processors of servers.

A resource is generally something that is consumed during execution of a workflow or job, such as a machine on the grid. Resources that are distributed throughout the grid include various objects. An object is a self-contained module of data and associated processing that resides in a process space. There can be one or multiple object per process. These objects can be distributed through various portions of the grid, e.g., in various geographic locations.

Objects can reside on various servers or server farms. A server farm environment can include different classes of resources, machine types and architectures, operating systems, storage and hardware. Server farms are typically coupled with a layer of load-balancing or distributed resource management (DRM) software to perform numerous tasks, such as managing and tracking processing demand, selecting machines on which to run a given task or process, and scheduling tasks for execution.

An important aspect of managing a computing system, particularly a distributed or grid-based computing system, is the task of managing resources in the system. In order to most effectively manage the resources, system managers need information about the resources, such as their usage patterns, so that managers can adjust how the resources are used by, for example, adding or removing resources from the grid.

One known and simplistic approach for collecting resource information is gathering raw data about a resource and dumping that data into a very large datastore. The datastore is filled with data over time, and when too much data has been collected, the system runs out of storage space. Consequently, data is removed from the datastore.

One shortcoming with known "fill and dump" approaches is that they requires a large storage system in order to accommodate the large amount of resource information that is being collected. An organization may run out of space to store this information depending upon how much of this information is needed for historical purposes. The storage problem is amplified when larger numbers of resources are to be monitored. One solution to this problem is using larger datastores. However, this solution is not desirable since the same storage limitations still exist.

Further, masses of data collected in this manner are not organized and are not in a form that can be easily understood. Thus, although a system manager may have very large quantities of raw resource data, the information contained within that data is not readily ascertained.

Another problem with known approaches is that a user may be unable to perform analysis of resource data over certain periods of time since the data that is required for the analysis has been removed from the datastore. In other words, conventional systems remove the "old" data and replace it with "new" data. However, the "old" data often has valuable information regarding trends of resources, particularly longer term trends. Thus, users are limited to resource data applicable to the short term, but not the long term and, therefore, are not able to accurately assess resource trends.

Accordingly, there exists a need for methods and systems for gathering data and modeling or representing resource data in such a way that the relevant or important information from the gathered data is retained and available to a user, without having to store large quantities of raw resource data. There also exists a need for systems and methods for ensuring that resource models and updates thereto are propagated to different groups of resources so that other resources and resource groups that may include or utilize a particular resource include updated information concerning that resource. Moreover, there exists a need for systems and methods for presenting modeled resource data to users over different periods of time so that resource trends can be readily ascertained. Embodiments fulfill these needs.

SUMMARY

One embodiment is directed to a method of gathering and propagating statistical information about resources in a distributed computing grid. The method includes receiving data relating to a resource in a first group of resources on the grid, providing the data to other resources in the first group and determining a statistical model for each resource in the first group based on the received data. The method also includes calling a second group of resources on the grid, determining a first statistical model of each resource in the second group and determining a second statistical model of each resource in the second group based on a determined statistical model of a resource in the first group.

Another embodiment is directed to gathering and propagating statistical information about resources in a distributed computing grid that includes receiving data relating to a resource in the first group of resources on the grid, providing the data to other resources in the first group and determining a statistical model for each resource in the first group based on the received data. The method also includes calling a second group of resources on the grid, determining a first statistical model of each resource in the second group and determining a second statistical model of each resource in the second group. The second group is higher than the first group in a hierarchy of groups of resources, and the second statistical model of a resource in the second group represents a combination of the first statistical model of the resource in the second group and the determined statistical model of a resource in the first group.

According to another embodiment, a method of gathering and propagating statistical information about resources in a distributed computing grid includes receiving data relating to a resource in a first group of resources on the grid and propagating the data to different resource groups on the grid. The other resource groups are hierarchically above the first group. Propagating data to different resources groups can be performed by providing received data to other resources in the first group, determining a statistical model for each resource in the first group based on the received data, calling a second group of resources on the grid, determining a first statistical model of each resource in the second group and determining a second statistical model of each resource in the second group of resources based on a determined statistical model of a resource in the first group.

In various embodiments, a second group can be called synchronously or asynchronously. Further, the a second or subsequent statistical model of each resource in a second or subsequent group can be based on received data having the same timestamp.

A second group can be hierarchically above the first group. For example, the second group can be a parent, a top group, or an intermediate group that is higher than the first group in a hierarchy.

BRIEF DESCRIPTION OF THE DRAWINGS

Referring now to the drawings, in which like reference numbers represent corresponding parts throughout, and in which:

FIG. 4F illustrates timing of tasks;

FIG. 4H illustrates timing of jobs;

FIG. 17 illustrates resources in different groups in a hierarchy of resource groups;

DETAILED DESCRIPTION OF ILLUSTRATED EMBODIMENTS

Embodiments of the invention enhance distributed grid computing systems or environments by providing a grid reporting system for processing and modeling resource information. Aspects of the grid reporting system include a gathering and modeling resource information, propagating resource information to different hierarchical levels or groups of resources, and storing and presenting resource information to a user. Resource information can be modeled and presented over different periods of time, including long periods of time, so that short-term and long-term resource trends, such as execution time, duration and pending time, can be analyzed, without having to store very large amounts of raw resource data in a datastore.

Certain embodiments are directed to enhancing distributed computing systems by providing a system and method for propagating statistical information about resources in a distributed computing grid. A determination can be made concerning a first statistical model of a resource in a first group of resources on a distributed computing grid. Resource models can be propagated to other hierarchical levels, such as a parent, grandparent or other level, so that higher level resource groups are updated appropriately. Thus, it is not necessary to store large amounts of raw resource data and models representing resources are available to a user.

Embodiments of the invention can be executed in a single computer (e.g., a client computer) or in multiple computers, e.g., between a client and one or more servers across a network connection and in various distributed computing environments. FIGS. 1-4I illustrate one exemplary computing environment or "grid" in which system and method embodiments for gathering, modeling and presenting resource data can be implemented. A "grid" is generally known as a collection of nodes, resources or hosts, each of which contributes one or more resources to the grid. The following description of an exemplary grid is provided for purposes of explanation and illustration. Persons skilled in the art will appreciate that embodiments can be used in other distributed computing environments.

Figure 1:
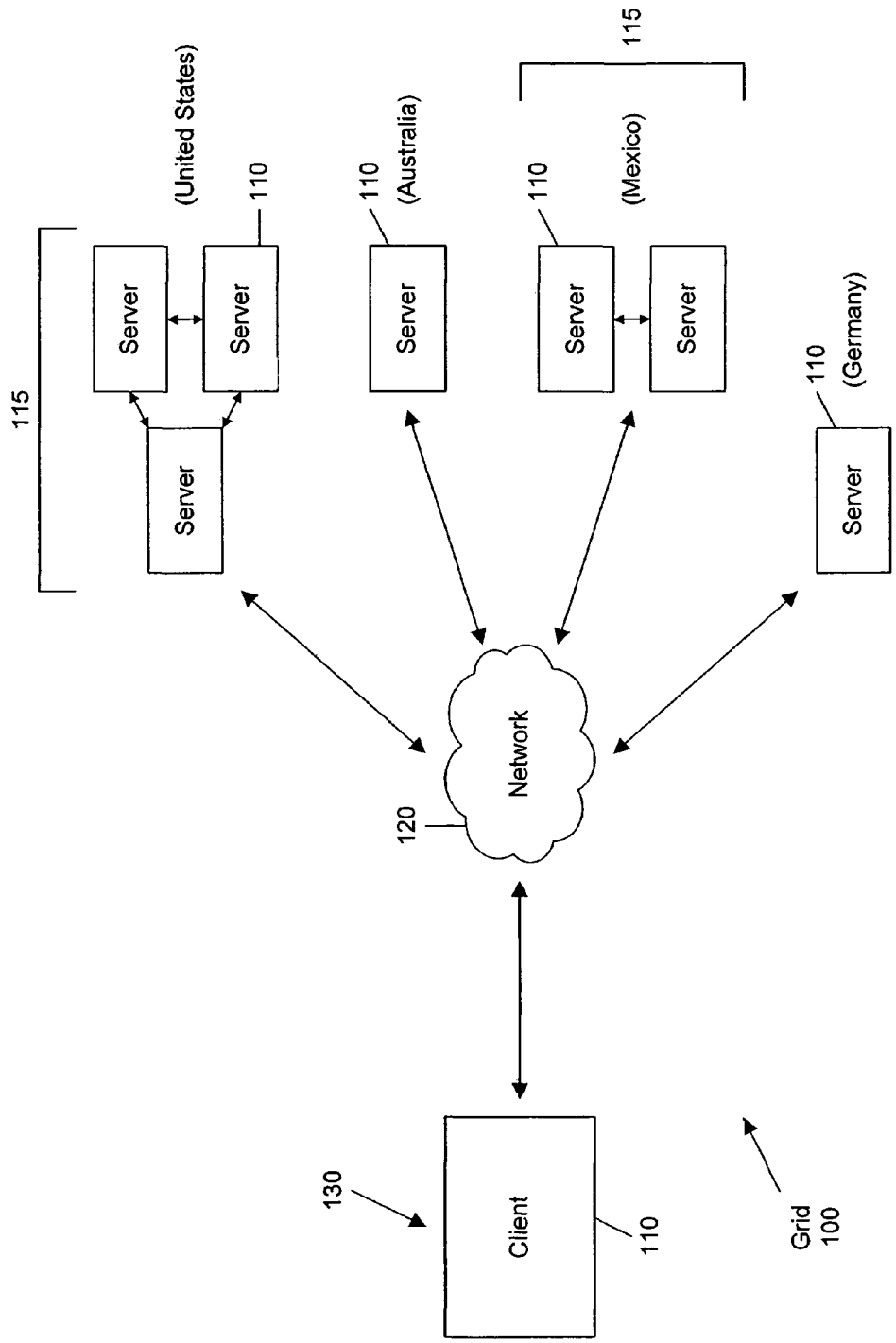
FIG. 1 is a block diagram generally illustrating a grid computing environment in which embodiments can be implemented.
Figure 2:
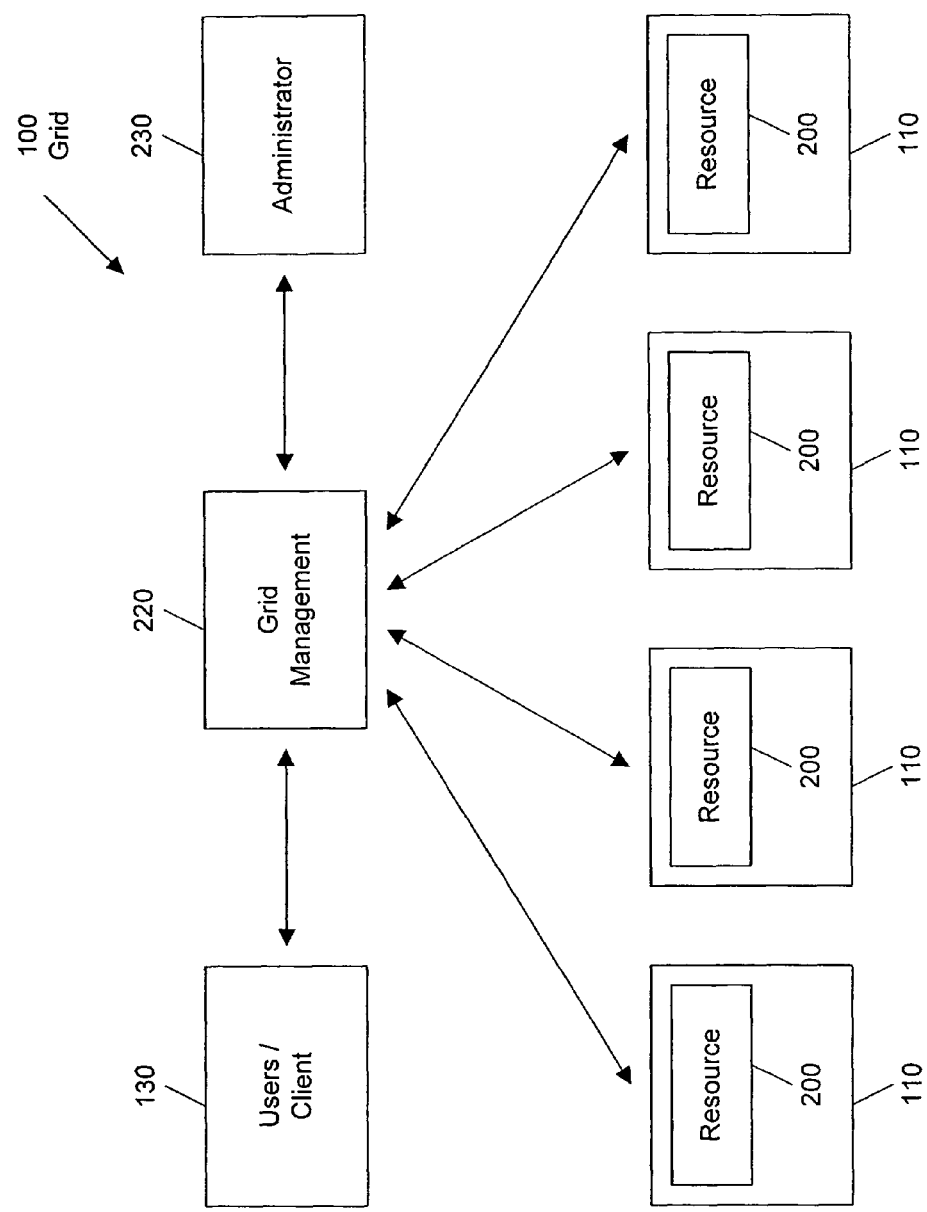
FIG. 2 is a block diagram further illustrating grid management and resources in a grid computing environment.

FIGS. 1 and 2 generally illustrate one exemplary computing grid 100 that includes various numbers of servers 110 or groups of servers or server farms or clusters 115, which are connected via a communication link 120. The communication link 120 can be a network connection, such as a Local Area Network (LAN), a Wide Area Network (WAN), and a Public Switched Telephone Network (PSTN). One computer 130 is identified as the client or the requesting entity, which issues a request for a resource from one or more of the servers 110. The request can be made by, for example, a client process or an object This specification generally refers to a client requesting entity for purposes of explanation, not limitation.

One or more servers 110 in one location can be connected to one or multiple or all of the other servers 110 of the grid via network 120. A server farm 115 or group of servers can be one node or component in a grid 100. Thus, a grid 100 can include different numbers of nodes or server farms 115. The grid 100 can also be distributed across different geographic domains, such as across offices (e.g., offices in the same or different location), different cities, states, countries and continents. Thus the grid may be local and/or external. For purposes of illustration, not limitation, FIG. 1 illustrates a grid 100 that is distributed across different continents. The client or requesting entity 130 is considered to be local or internal and the other servers 110 connected to the network 120 are external relative to the client 130.

The grid 100 can be used to, for example, run an application on multiple servers, allocate computing resources among grid components, provide parallel processing and provide enhanced data storage and processing capabilities. The grid 100 can also be used to allocate and share equipment, software and licenses. For example, if resource on a server 110 is overloaded, a job request can be directed to another server in the grid that has that resource so that the request can be processed. This specification generally refers to a grid in the context of distributed computing and resource allocation, however, grid environments can also be used with other applications, such as communications involving cell phones and personal digital assistants (PDAs).

Referring to FIG. 2, a grid 100 is generally an interconnected set of nodes or servers 110, which host one or more resources 200. The same resource 200 can reside on one or more or all of the servers 110. The resources 200 and organization and control thereof can be managed 220 and controlled by an administrator 230.

Figure 3:
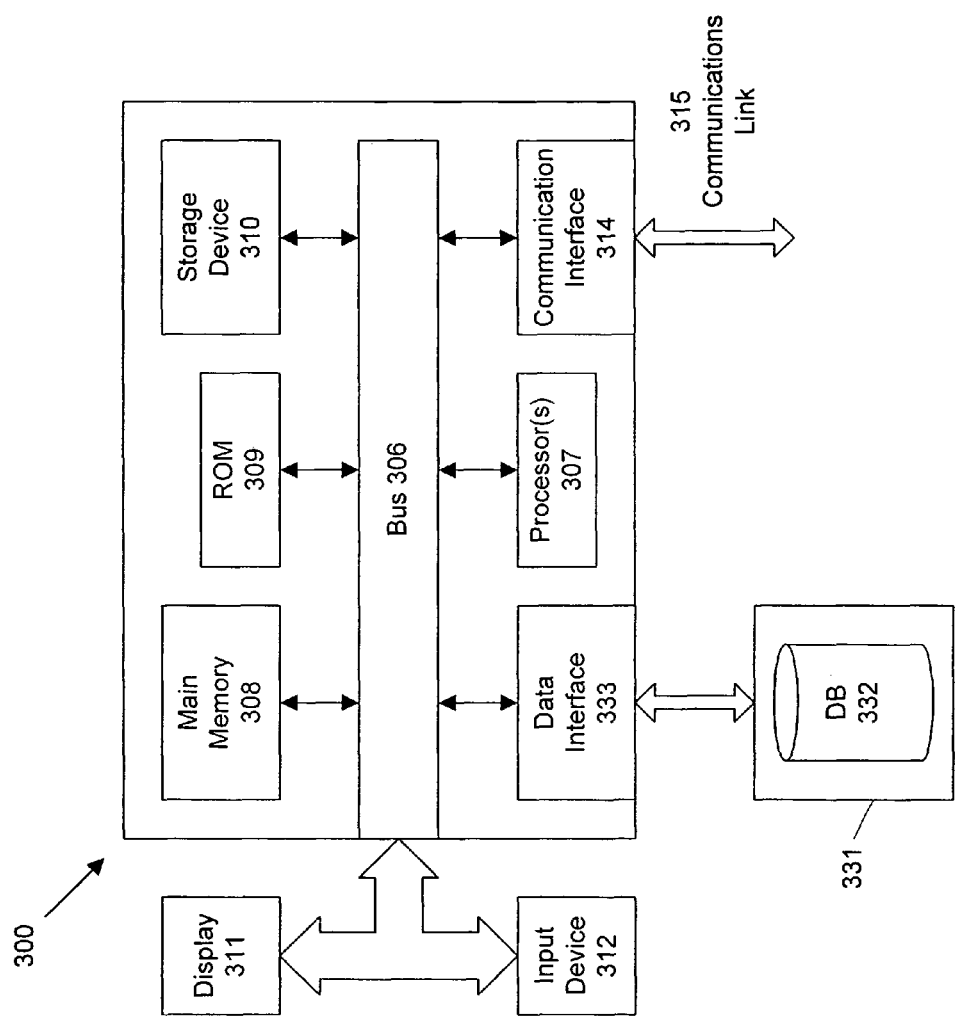
FIG. 3 is a block diagram of an exemplary server of a computing grid.

One exemplary computer system or server 110 that can be used in the grid 100 is shown in FIG. 3. The terms server, computer and computer system are broadly used to describe any computing device that can store and run one or more programs to implement method and system embodiments. Sequences of instructions of embodiments can be performed by a single computer system or server 110 or two or more computer systems or servers 110 coupled by a communication link 315, which serves as an interface to a communications network 120.

Each computer system 300 may include a communication interface 314 coupled to a bus 306. The interface 314 provides two-way communication between computer systems 300 through communication link 315 and network 120. The communication interface 314 transmits and receives electrical, electromagnetic or optical signals that include data streams representing various types of signal information, e.g., instructions, messages and data. The communication link 315 connects one computer system 300 with another computer system 300. For example, the communication link 315 may be a LAN, in which case the communication interface 314 may be a LAN card, or the communication link 315 may be a PSTN, in which case the communication interface 314 may be an integrated services digital network (ISDN) card or a modem, or the communication link 315 may be the Internet, in which case the communication interface 314 may be a dial-up, cable or wireless modem. Other communication interfaces and links can be utilized as needed. The computer system 300 may transmit and receive messages, data, and instructions, including program, such as an application or code, through its respective communication link 315 and communication interface 314. The received program code may be executed by the respective processor(s) 307 as it is received, and/or stored in the storage device 310, or other associated non-volatile media, for later execution.

The computer system 300 can operate in conjunction with a data storage system 331, e.g., a data storage system that contains a database 332 that is accessible by the computer system 300. The computer system 300 communicates with the data storage system 331 through a data interface 333 coupled to the bus 306. The system 300 transmits and receives electrical, electromagnetic or optical signals, that include data streams representing various types of signal information, e.g., instructions, messages and data. In embodiments, the functions of the data interface 333 may be performed by the communication interface 314.

The system 300 includes a bus 306 or other mechanism for communicating instructions, messages and data, collectively, information, and one or more processors 307 coupled with the bus 306 for processing information. The system 300 also includes a main memory 308, such as a random access memory (RAM) or other dynamic storage device, coupled to the bus 306 for storing dynamic data and instructions to be executed by the processor(s) 307. The main memory 308 also may be used for storing temporary data, such as variables and other intermediate information during execution of instructions by the processor(s) 307.

The system 300 may further include a read only memory (ROM) 309 or other static storage device coupled to the bus 306 for storing static data and instructions for the processor(s) 307. A storage device 310, such as a magnetic disk or optical disk, may also be provided and coupled to the bus 306 for storing data and instructions for the processor(s) 307. The computer system 300 may be coupled via the bus 306 to a display device 311, such as, a cathode ray tube (CRT), for displaying information to a user. An input device 312, e.g., alphanumeric and other keys, is coupled to the bus 306 for communicating information and command selections to the processor(s) 307.

An individual computer system 300 performs specific operations by their respective processor(s) 307 executing one or more sequences of one or more instructions contained in the main memory 308. Such instructions may be read into the main memory 308 from another computer-usable medium, such as the ROM 309 or the storage device 310. Execution of the sequences of instructions contained in the main memory 308 causes the processor(s) 307 to perform the processes described herein. Hard-wired circuitry may be used in place of or in combination with software instructions. Persons skilled in the art will appreciate that OL system and method embodiments can be implemented using other computer systems and hardware and/or software.

Further, embodiments may be stored on various types of computer-usable medium, which is any medium that provides information or is usable by the processor(s) 307. Exemplary media include non-volatile, volatile and transmission media. Non-volatile media, i.e., media that can retain information in the absence of power, includes the ROM 509, CD ROM, magnetic tape, and magnetic discs. Volatile media, i.e., media that can not retain information in the absence of power, includes the main memory 308. Transmission media includes coaxial cables; copper wire and fiber optics, including the wires that comprise the bus 306, and can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Figure 4A:
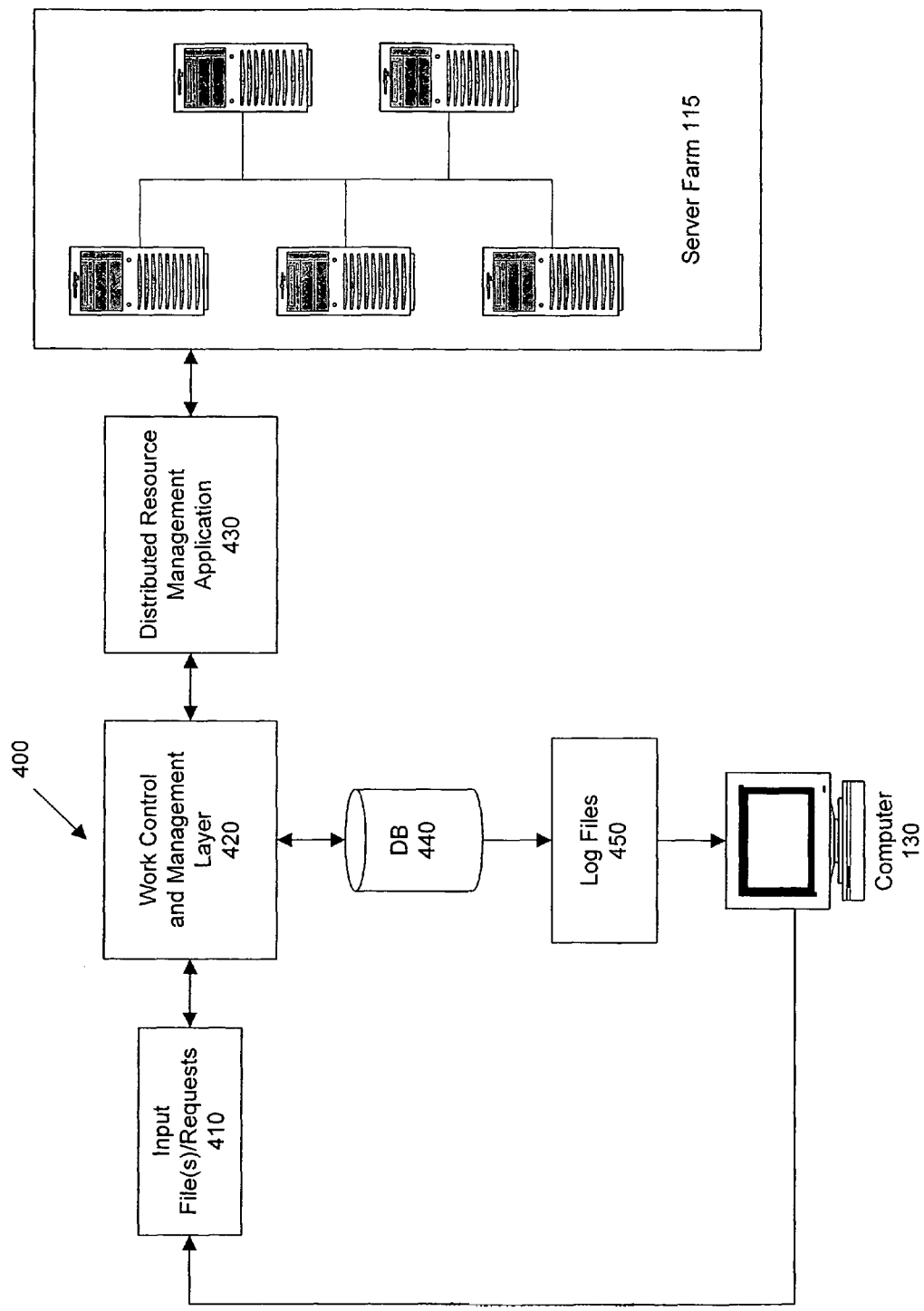
FIG. 4A is a block diagram generally illustrating a grid computing environment having a work control and resource management elements.

Referring to FIG. 4A, according to one embodiment, control and management 220 of the grid 100 and requests issued over the grid 100 is performed using gridMatrix 400, developed by Cadence Design Systems, Inc., 2655 Seely Avenue San Jose, Calif. 95134. The gridMatrix 400 is middleware or software that provides users and administrators control over jobs in the grid. More specifically, the gridMatrix 400 is a job definition, control monitoring and reporting software program.

The exemplary system or environment includes a workstation or client computer 130, from which a user can create and submit one or more input files 410. The input files 410 can be, for example, Job Request Language (JRL) files, that define a work request specifying one or more jobs having one or more executable task commands. Processes use JRL in conjunction with the control and management layer 420, one example of which is the gridMatrix 400, to manage execution of work in the grid 100.

The gridMatrix 400 interprets JRL files 410 and compiles them into objects, which execute on a server 110 or server farm 11 or invoke executables to be run on a server 110. Typically, the objects are passed through the DRM application 430 that schedules and manages work to be run on the processors 107 of a server 110. More specifically, the gridMatrix 400 interprets JRL work requests 410, instantiates distributed objects, invokes software servers to manage execution of commands, and interfaces with DRM 430 applications.

The commands and data correspond to the work that is defined in the input file 410. Thus, the gridMatrix 400 interprets and acts upon the input file 410 and causes the DRM application 430 to execute task commands on a server 110. The database 440 stores information related to many of the processes described herein.

For example, task commands constituent to a piece of work are essentially instantiated into computing objects, which are maintained persistently in the database 440. A persistent object is an object that continues to exist after the program that created it has been unloaded and is stored for later use. Persons skilled in the art that "persistent" in the context of an object generally refers to the duration of the object. Embodiments, therefore, are not to be, limited to objects that exist for particular periods of time. Rather, persistent objects may be permanent or temporary and exist for various durations.

Objects are also made to be distributable so that they are accessible to different processes within the work execution flow. Implementation of a conventional distributed object model architecture, such as Common Object Request Broker (CORBA), can be used. CORBA or another suitable standard provides the ability to communicate between objects. A database module of the gridMatrix 400 contains base classes for all objects in the database 440.

An artifact is a piece of data that is used, generated or discarded while working with the grid. Artifacts that are used by the gridMatrix 400 include job definitions, work, tasks, jobs, and workspaces. Each of these artifacts is described in further detail below.

A job definition defines jobs and tasks that will be run when a job is submitted to the gridMatrix 400. The gridMatrix 400 allows users to add job definitions via JRL into the gridMatrix Database. The gridMatrix 400 keeps statistics on job runs, and this information can be presented in text and graphic formats to optimize job definitions for greater efficiency. JRL is the primary mechanism used to import a job definition into the gridMatrix 400. Job definitions can be added to the gridMatrix 400 and stored in a gridMatrix database. One benefit of adding a job definition is that the gridMatrix 400 can store historical information about consecutive job runs which use the same job definition. This information can be analyzed to help determine where the problems are in the process and help optimize the process for decreased execution time. After running a job against a job definition, the definition can be changed to fix problems with the process, to optimize this process, or to add more jobs to the definition.

The gridMatrix 400 can gather statistics from running jobs against the same job definition several times. Trends of execution time, duration, and pending time are given in a graph to show how the process is performing over time. Duration is the wall clock amount of time to run the job from submission to completion. Pending is the amount of time it takes the DRM 430 to dispatch the jobs to machines in the grid 100. Sequential is the cumulative amount of time it takes to run the tasks on machines in the grid 100 (i.e., if run sequentially, how long it would take).

Figure 4B:
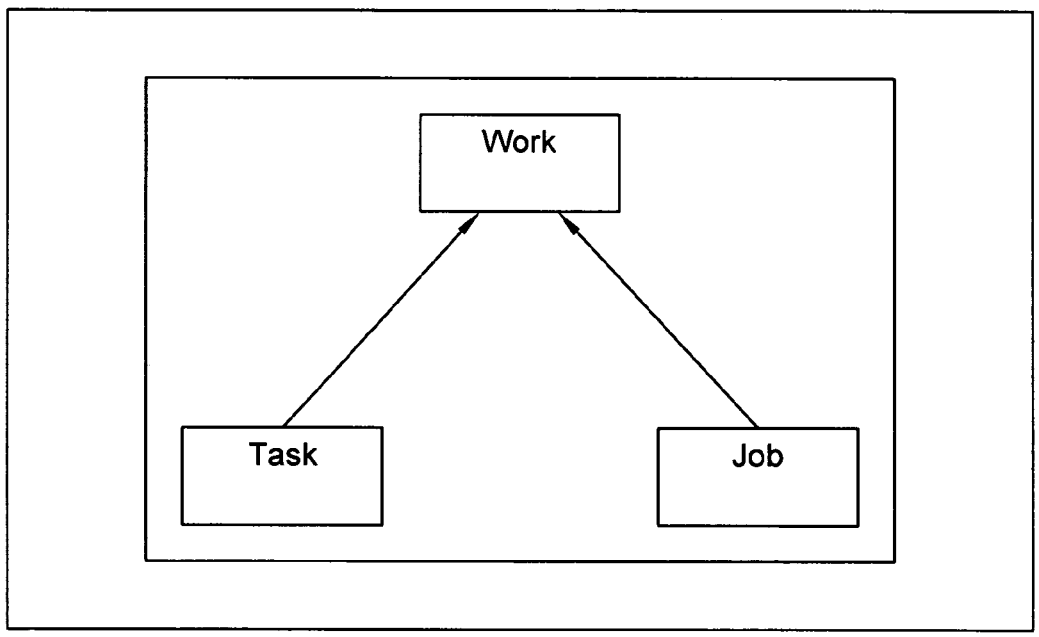
FIG. 4B illustrates jobs and tasks as different types of work.

Referring to FIG. 4B, "work" or "workflow" represents all types of work, including jobs, topjobs and tasks. Work, and constituent jobs, can be defined with one or more JRL files. Work and workflow are generic terms for anything that the gridMatrix 400 can execute and control. Thus, "work" and "workflow" are generic terms for anything that the work control and management layer 420 can control, execute, or cause to be executed.

Work may include processes to compile or build a program, to create file directories, install applications, maintain job dependencies, etc. In other words, work includes whatever a user needs to be performed or processed.

Figure 4C:
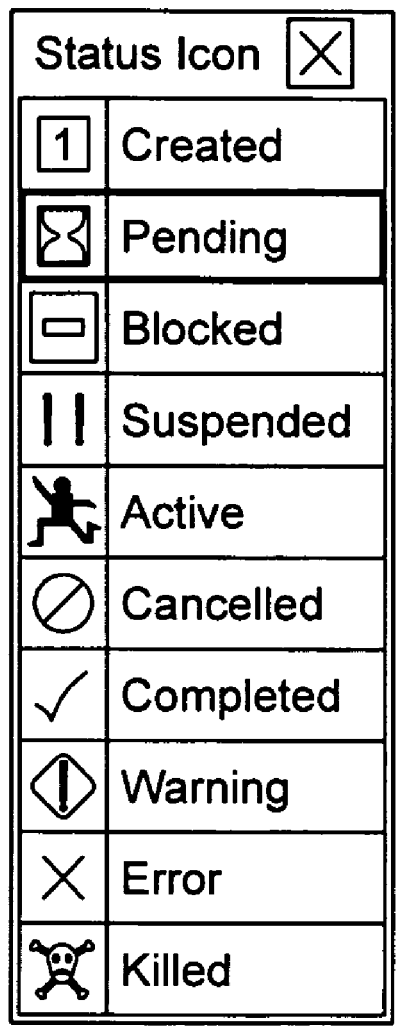
FIG. 4C illustrates states of work.
Figure 4D:
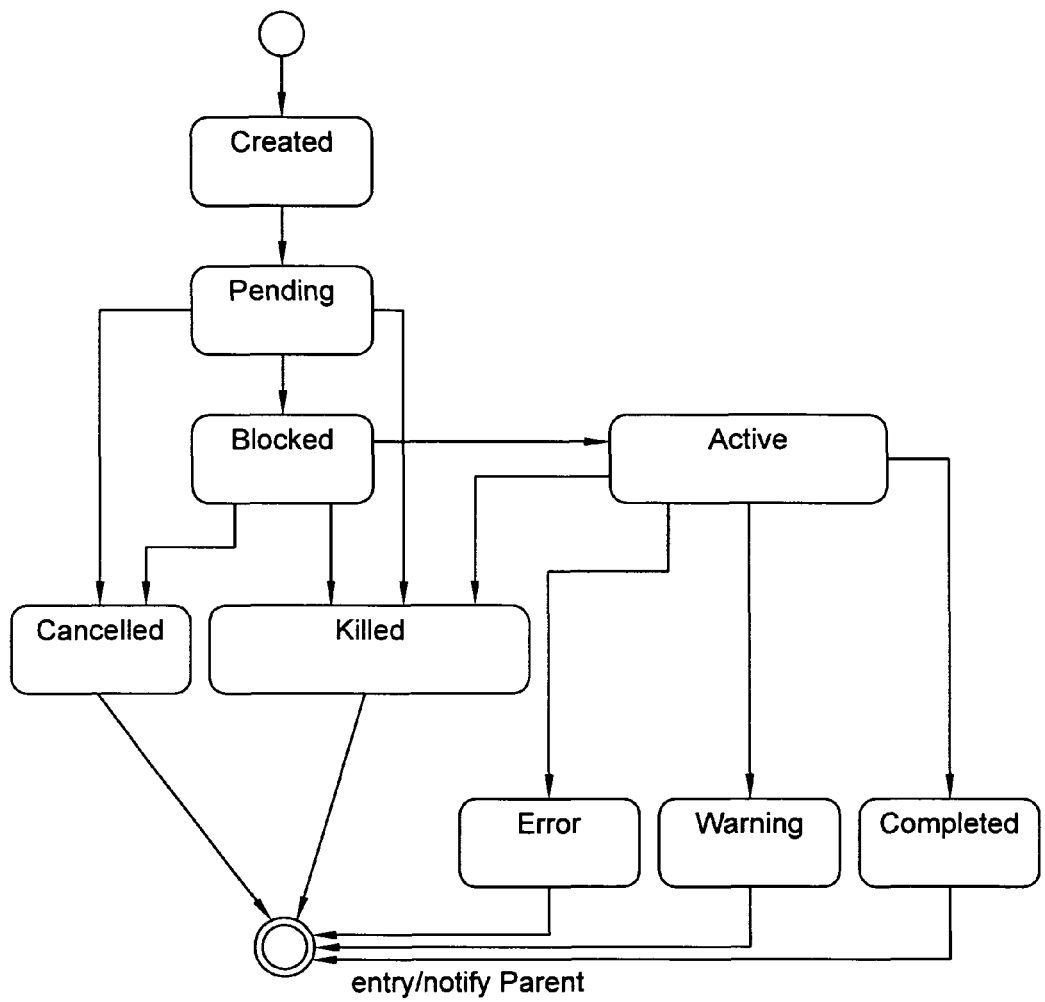
FIG. 4D further illustrates states of work.

Referring to FIGS. 4C and 4D, according to one embodiment, there are nine work states in the gridMatrix 400. Each states determines the behavior of the work and limits the next state(s) that it can transition into.

More specifically, the created state is the starting state of all work in the gridMatrix 400. Work will move from the created state to a scheduled state when scheduled for execution. The "pending" state follows the created state and denotes that work has been scheduled, but has not been sent to be executed. When work is sent for execution, it moves to the "blocked" state. In other words, after work has been pending, it moves to the blocked state, which denotes that the work has not met the criteria to be executed. When the criterion for the work has been met, the work will be moved to the active state. Tasks may be suspended until manual intervention to resume is performed. When work has met the criteria for leaving the blocked state, it moves to the active state. Work that completes its activity without warning, error or termination, transitions from the active state to the completed state. This state is also referred to as the successfully completed state. Work that is completed with some warnings, but no errors or termination, transitions from the active to warning state. The conditions for completion of work with warnings can be specific to the type of work. Work that completes with some errors, but not termination, transitions from the active to error state. The conditions for completion of work with an error can be specific to the type of work. Work properly terminated using, for example, a "matrix kill" command, after the created state, but before entering one of the finished states (completed, warning and error), moves to the killed state. The actions and conditions for a killed state can be specific to the different types of work. Work can be cancelled when criteria for execution cannot be satisfied. This can be due to a number of different factors.

A task is represented in a job definition as described by JRL, much the same as the job is represented. A task is a type of work and inherits all of the operations from work. A task represents the actual command that needs to be called in the grid 100. In other words, a task is an atomic unit of work that is performed on a server 110 and is a command that is executed on one or more processors of a networked multiprocessor computing environment.

Figure 4E:
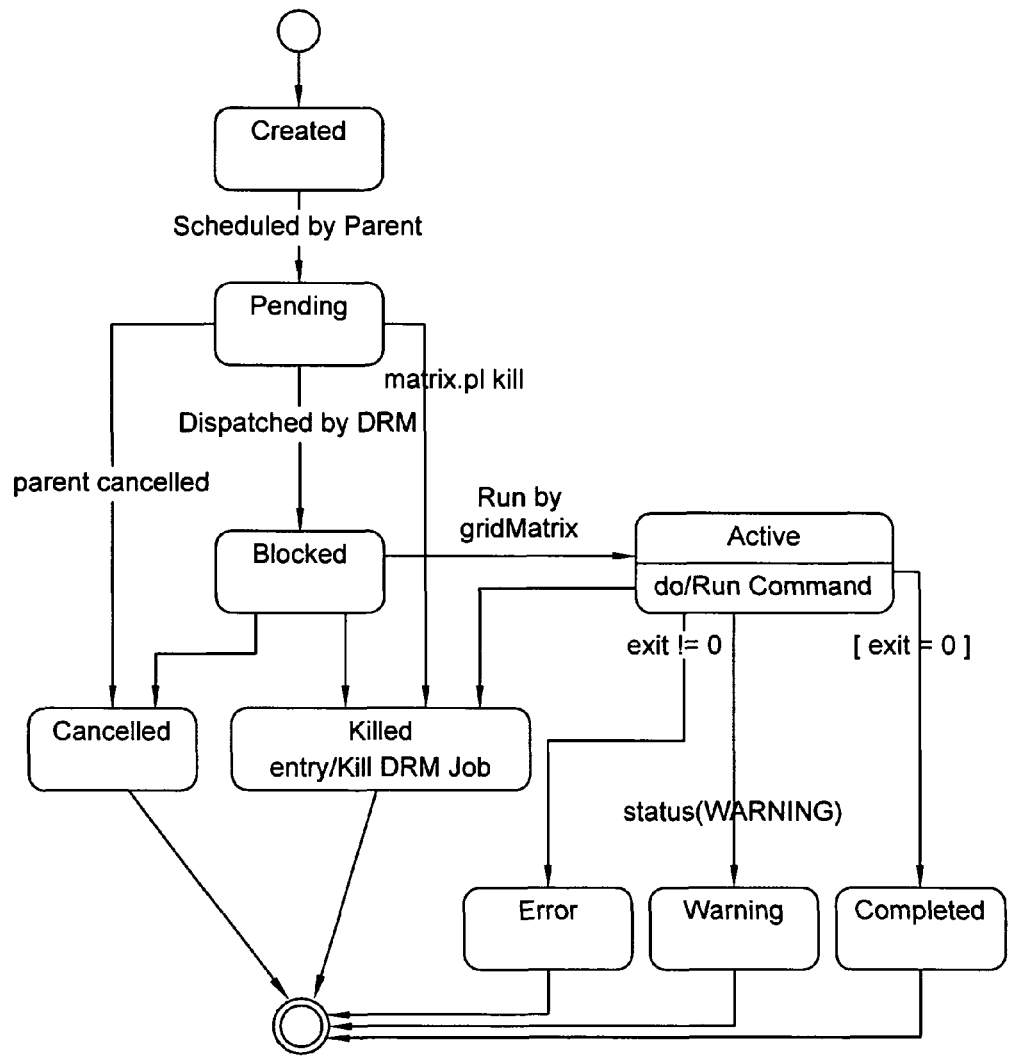
FIG. 4E illustrates states of a task.

Referring to FIG. 4E, a task has certain states. According to one embodiment, a task has the same states as work. A task begins in the created state. A task is moved from the created state to a pending state when a parent job schedules the task. The task is scheduled when the parent job is moved to the active state. Tasks in the pending state can be moved to the blocked state. A task is moved from the pending state to a blocked state when the task is submitted to the DRM 430. The task stays in the blocked state until the DRM 430 executes it. All tasks must move through the blocked state before actually performing work. The longer a task is in the blocked state, the longer it sits in the DRM 430 queues waiting to be distributed to a machine. The job will continue to stay in the blocked state until all of its dependencies have been satisfied. Tasks may be suspended until manual intervention to resume is performed. A task is moved from the blocked state to an active state when the task is actually executed on a host machine for the task.

A task is moved from the active state to a completed state when the corresponding command has finished executing. After the job is set to the completed state, it notifies its parent that it has finished. This is a type of state propagation that begins a chain of notification when a task's parent is notified. The parent will only change its state to completed when all of its children have the state completed.

A task can be moved from the active state to a warning state, after which the job notifies its parent that it has finished. This is a type of state propagation that begins a chain of notification when it's parent is notified. The parent will only change its state to warning when all of its children are in a finished state (completed, warning or error) and at least one in the warning state. A task is moved from the active state to an error state when the command executed returns a exit value that is not 0 (which is the standard failure exit code for commands). After the job is set to the error state, it notifies its parent that it has finished. This is a type of state propagation that begins a chain of notification when it's parent is notified. The parent will only change its state to error when one of its children have the state error. A task transitions from a previous (not finished) state to the killed state when a gridMatrix kill command is issued. The user can specify any of the jobs or tasks by ID when killing a job. When a task is moved to this state, it will kill all processes and sub processes of the executing command. The state propagation moves both up and down the tree. After the job completes "killing" its subwork, it notifies its parent that it has finished. The parent will only change its state to killed when all of its children are in a finished or a killed state. A killed state also results if a timeout is set for a job or task and the job doesn't finish in the set time. A task transitions from a pending or blocked state to a cancelled state when a parent is canceled. Since tasks do not have dependencies, they can not be cancelled directly. Rather, only their parent jobs can be cancelled, and as a result the task will never run, and it is marked cancelled.

Tasks in a job are run sequentially. A task does not start until all previous subworks are finished. If the previous subwork is a task, then it does not start until that task is completed. If the previous subwork is a job, then the task will not start until all previous jobs are complete.

FIG. 4F illustrates one example of timing of tasks. As can be seen in FIG. 4F, tasks are not in a pending state until its parent job is in an activate state (1.1.1.1.). Further, parent jobs are not completed until all of the tasks are completed (1.3). Additionally, tasks that are neat to each other in the job definition are run sequentially (1.5.1.3). When a task's command finishes, the exist status is set in the gridMatrix. For example, an error can be indicated by =!0, completed is indicated by =0.

A job is a type of work and represents a collection of jobs and/or tasks to be executed in the grid 100. Tasks are grouped together to form jobs. A job can be executed, controlled and reported by the management layer 420. Jobs can have zero or more sub-works, which can be a task or another job (i.e., sub-job). JRL provides the capability of defining jobs and passing parameters to the job definitions, which are instantiated as job objects. The parameters are used to create commands that represent tasks that execute on a server. The results of a task are maintained in a log file 450.

The gridMatrix 400 runs all jobs in parallel. All jobs can be run at the same time. Placing dependencies between the jobs lets the gridMatrix 400 know what order the individual tasks should be executed. The gridMatrix 400 gives the user the ability to define dependencies between jobs within the job definition. A job with a dependency, or multiple dependencies, does not execute until all dependencies are satisfied. More specifically, jobs encompass prerequisites and dependencies and can depend on any other job or subjob in a job definition. Job dependencies define the order that jobs are executed. A job may have 0 or more subworks, which can be a task or a job. This layering of jobs allows users to define complex multi-leveled job definitions in the gridMatrix 400. Thus, a user can break down complex processes into small and manageable steps that can be analyzed and controlled.

Figure 4G:
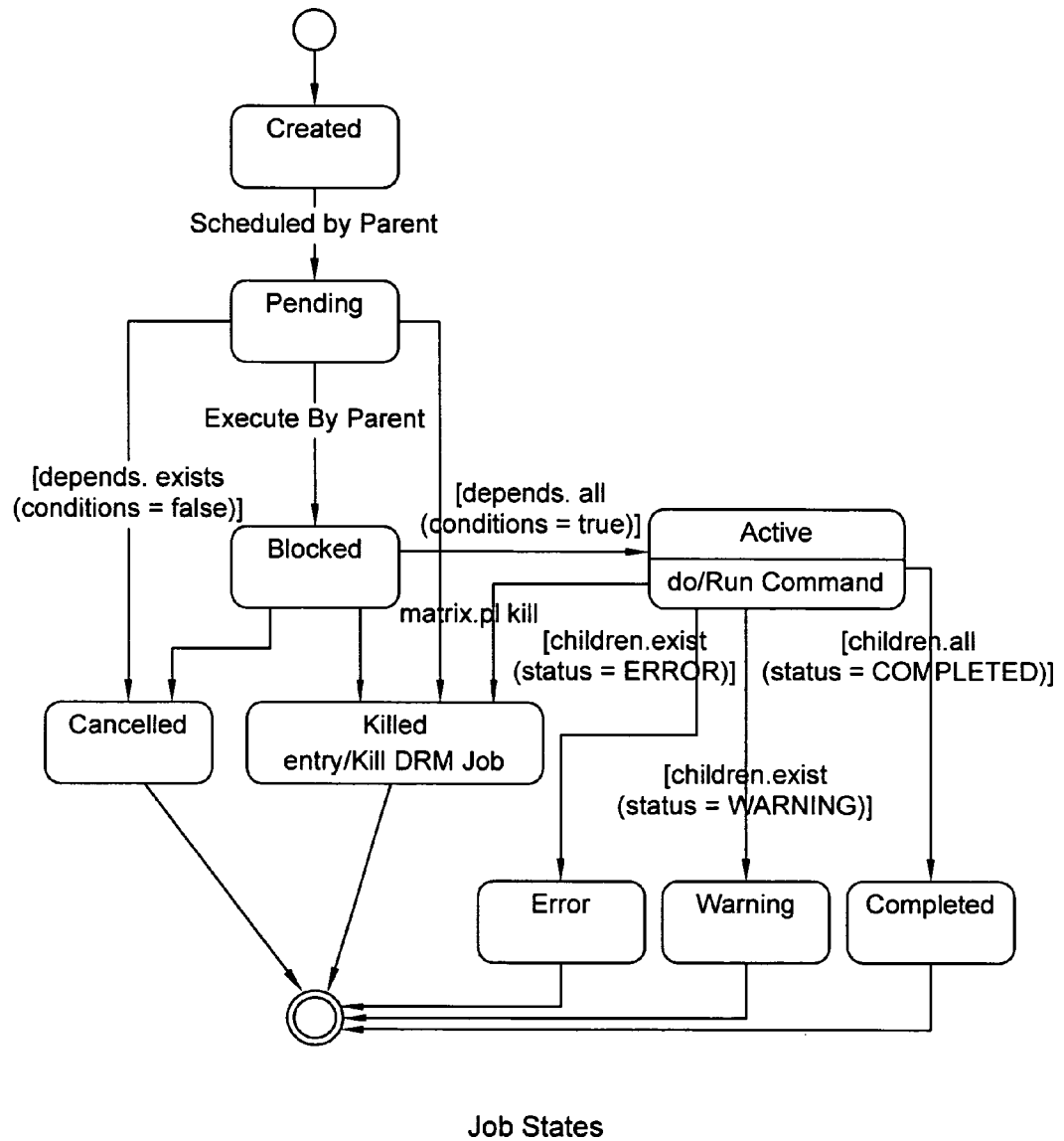
FIG. 4G illustrates states of a job.

Referring to FIG. 4G, a job has states that are similar to the states of work. The names of the states are the same, but there are additional ramifications to the states of a job. All jobs begin in the created state. A job is moved from the created state to a pending state when the parent job schedules the job. If the job is the top level job, it is scheduled by the gridMatrix when the job is submitted to be run. A job is moved from the pending state to a blocked state when the parent job executes the job. All jobs must move through the blocked state before actually performing work. The job will continue to stay in the blocked state until all of its dependencies have been satisfied. Tasks may be suspended until manual intervention to resume is performed.

A job is moved from the blocked state to an active state when all the dependencies of the job have been satisfied. Each time a dependent job finishes, a message is sent to the job that it depends on, and the gridMatrix 400 checks the dependency criteria for all of the dependent jobs. If all criteria are satisfied, the job can move into the active state. When a job is in the active state, all subworks are first scheduled (subworks are moved to the pending state) and then the gridMatrix 400 will execute all subwork of the job (all subworks are moved to the active state). This propagation of state continues to the leaf nodes of the job aggregation tree. The timing diagram for the job shows the propagation of state.

A job is moved from a pending or blocked state to a canceled state when the job's dependencies cannot be satisfied, e.g., when conditional dependencies are used. For example, if a job has a dependency on another job finishing in the error state and the job finishes in the completed state, then the job will be moved into the cancelled state and will never execute. After a job is moved into the cancelled state, it notifies its parent it has finished. This is another type of state propagation, but unlike the active state propagation that moves down the tree, this propagation goes from child to parent.

A job is moved from the active state to a completed state when all of its subworks have been moved to the completed state. When a subwork finishes, it notifies its parent that it has finished. The parent job checks the status of all of its subwork and sets the state to completed if all subwork is completed. After the job is sent to the completed state, it notifies its parent that it has finished. This is another type of state propagation, but unlike the active state propagation that moves down the tree, this propagation moves from child to parent. The parent will only change its state to completed when all of its children have the state completed.

A job is moved from an active state to a warning state when all of the job's subworks have been moved to a finished state (completed, warning or error) with some subworks state being warning. When a subwork finishes, it notifies its parent. The parent job checks the status of all of its subwork and sets the state to warning if at least one of the subworks is in the warning state. After the job is set to the warning state, it notifies its parent that it has finished. This is another type of state propagation, but unlike the active state propagation that moves down the tree, this propagation moves from child to parent. The parent will only change its state to warning when all of its children are in a finished state (completed, warning or error) and at least one in the warning state.

A job transitions from an active state to an error state when all of its subworks have been moved to a finished state (completed, warning or error) with at least one in the error state. When a subwork finishes, it notifies its parent that it has finished. The parent job checks the status of all of its subwork and sets the state to error if at least one of the subworks is in the error state. After the job is sent to the error state, it notifies its parent that it has finished. This is another type of state propagation, but unlike the active state propagation that moves, down the tree, this propagation goes from child to parent. The parent will only change its state to error when all of its children are in a finished state (completed, warning or error) and at least one in the error state.

A job transitions from a previous (not finished) state to the killed state when a kill command is used. The user can specify any of the jobs or tasks by ID when killing a job. When a job is moved to this state, it will set the state of all of its subwork that is not finished to the killed state. This propagation is similar to the active state propagation as it travels down the job aggregation tree "killing" all of the children down to the leaf nodes of the tree. In addition to moving down the tree, the state propagation moves up the tree in the same manner as the other finished states. After the job has "killed" its subwork, it notifies its parent that it has finished. The parent will only change its state to killed when all of its children are in a finished state or killed state.

FIG. 4H illustrates one example of timing of jobs. Subjobs are not submitted until a parent job is in an active state. (1.2; children 1.21-4). Further, all jobs pass through a blocked state before becoming active. Jobs with dependencies are put into a blocked state until dependent jobs are completed. For example, as shown in FIG. 4H, 1.3 starts after 1.2 finishes. Further, jobs are not completed until all children jobs are completed. This is true for all finished states (completed, warning and error).

Tasks are executed in an execution environment. The task's execution environment consists of environment variables and a directory hierarchy or working directory. The gridMatrix 400 allows users to define the directory hierarchy and working directory through a concept named workspace. All tasks are run with respect to a workspace. Workspace creation is controlled and monitored by the management layer 420 or the gridMatrix 400. After execution of the tasks within a given workspace, the resources associated with the given workspace are automatically deconfigured, or purged so that resources are freed up for use by other jobs. Further details concerning work, jobs, subjobs, tasks and workspaces are provided in the provisional and non-provisional applications that were previously incorporated herein by reference.

Figure 4I:
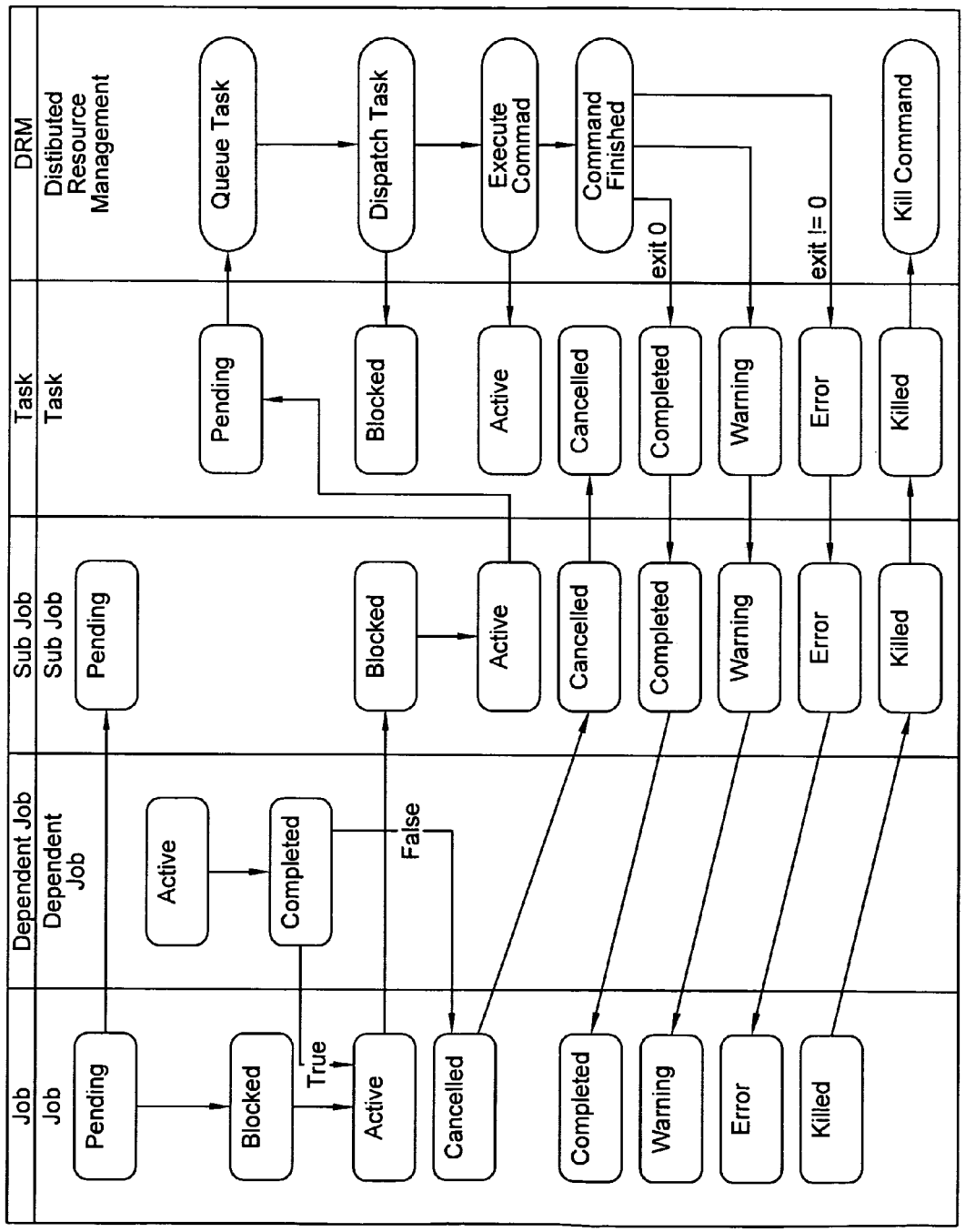
FIG. 4I illustrates how jobs, tasks and a distributed management system of a distributed computing environment interact with each other.

FIG. 4I illustrates how jobs, tasks and the DRM 430 interact with each other. The illustrated example shows how a job with a dependent subjob interacts. More specifically, the job is placed in a pending state by its parent. The job transitions to a Blocked state automatically. The dependent job moves to a completed state from the active state. If the condition on the dependency evaluates to true, the job is moved to an active state. If the condition of the dependency evaluates to false, the job is moved to a cancelled state, which is propagated down to a subjob and the task of the job.

The subjob is moved to a blocked state. The subjob has no dependencies and is moved to an active state automatically. The task is moved to a pending state and is sent to the DRM 430 to be executed. When the task begins execution, the task is marked active. When the task is completed, it can assume one of three states. First, if the exit code is zero, then task assumes a completed state. If the exit code is non-zero, then the state will be an error state. A warning state can be set by a command through a module. The status is passed to the subjob and then up to the job. A job can be killed, and this is propagated down to an individual task. The DRM 430 is notified to kill the command.

Embodiments provide methods and systems generally referred to herein as the "grid reporting system" for reporting information relating to resources in the grid. Embodiments of the invention can be implemented in the distributed computing grid environment described above and shown in FIGS. 1-4I, e.g., in the gridMatrix 400. The grid reporting system reports on grid resources, their status, statistics about the resources, and alerts, such as resource errors, that occur concerning those resources.

A resource is generally something that is consumed during an execution of a job on the grid. They can be physical and virtual. Exemplary resources include, for example, a host, a machine, a device on a machine, a license and a set of licenses. Persons skilled in the art will appreciate that embodiments can be applied to various resources and different types resource data. This specification generally refers to a resource as including these exemplary resources and other resources that can be used within a grid. Further, persons skilled in the art will appreciate that resource data can be gathered from various numbers of nodes, servers and resources. Accordingly, embodiments are not intended to be limited to a particular number or configuration of servers or nodes on the network.

One aspect of a grid reporting system is directed to a method and system of gathering or collecting raw or original resource data and processing that data so that it is integrated into a statistical model. This specification refers to a "gatherer," as a conceptual object that is used to gather and store a statistical model of the data.

A gatherer collects raw, unfiltered, unprocessed or original data (generally "raw" data) and essentially compresses or reduces the size of that data into a statistical model. One or multiple gatherers, such as a chain of gatherers, may be utilized. Each gatherer generating a model. The modeled data is, in effect, a summary of the raw resource data, which provides important resource information without having to store large amounts of raw resource data. The input to a first gatherer is raw resource data, and the output of the first gatherer is a first statistical model or summary of that data. The first model or summary is provided to a second gatherer, which generates or updates its own model based on the first model generated by the first gatherer. Thus, the second statistical model generated by a second or subsequent gatherer is not generated directly from the first set of data. Rather, it is generated based on a model of the data.

Figure 5:
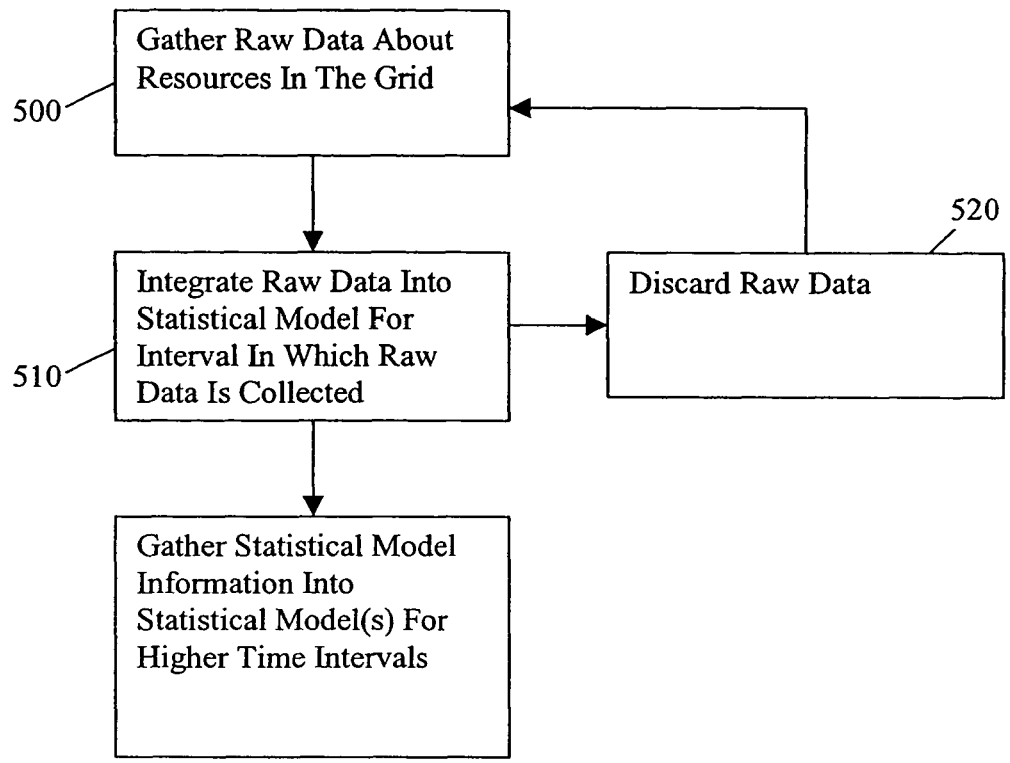
FIG. 5 is a flowchart illustrating a method of gathering raw resource information and generating a statistical model according to one embodiment.

More specifically, referring to FIG. 5, in step 500, raw data is collected or acquired from a resource on the distributed computing grid. In step 510, a statistical model or summary of that data is generated and stored. In step 520, raw data that was used to generate the model can be discarded or provided to another gather. In step 530, the first model that represents data in intervals of a first time is gathered into a model that represents data in intervals of a second time.

Figure 6:
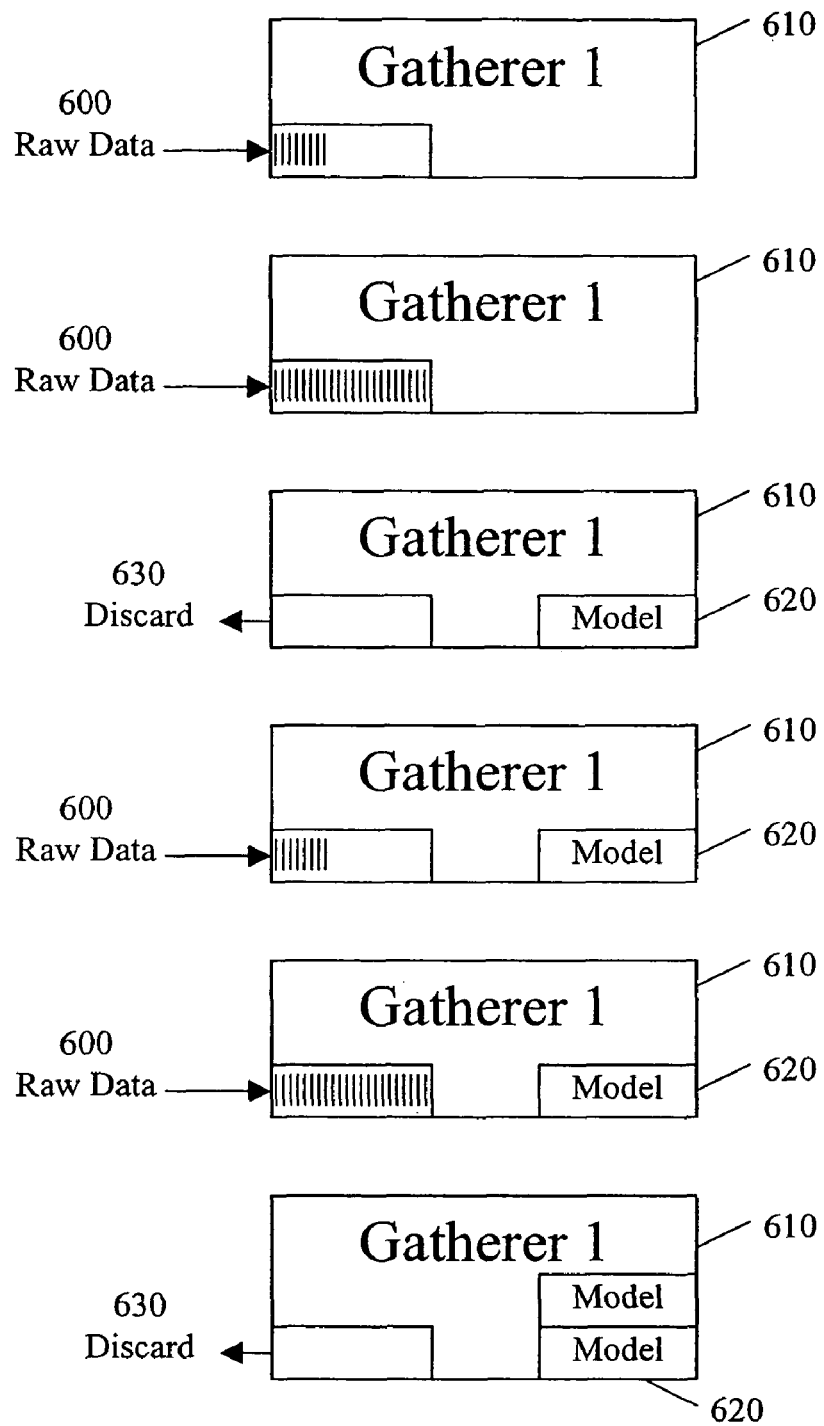
FIG. 6 is a flow chart generally illustrating a gatherer that collects data, generates a statistical model, and discards data after a model is generated according to one embodiment.

FIG. 6 graphically illustrates a gatherer acquiring data and generating a statistical model. Raw data 600 can be collected by a gatherer 610 from one node, multiple nodes or all nodes of a server farm, e.g., every machine in a server farm, and every resource on a server farm. Raw data 600 can be gathered from every machine in a server farm and from every resource. Raw data that is collected can be, for example, memory availability, swap availability, the number of running jobs, utilization percentages, free disk space, I/O paging rate etc. and other data that indicates performance and usage of resources. Persons skilled in the art will appreciate that any information relating to the resource can be gathered and modeled.

Data can also be gathered periodically and gathered into different intervals. In one embodiment, raw resource data is gathered every three to five minutes. Other time intervals can be utilized, for example, five minute, 15 minute, one hour, two hour, and other intervals for different periods of time. The interval and gathering period can vary depending on the timeframe or trends to be analyzed.

A gatherer 610 gathers the collected data in intervals of time for a certain period, and a statistical model 620 is generated based on the gathered data. The statistical models can, for example, be generated periodically (e.g., every half-hour, every hour, etc.) For example, raw data may be gathered in an interval of five minutes, and a gatherer can take data that it has been gathering for a period of time, e.g., the last 35, 40 minutes, and generate a statistical model of that data in five-minute intervals. After a model is generated by a first gatherer, the raw resource data can be removed 630 from the first gatherer so the first gatherer is not required to store the data. Alternatively, if there is another gatherer in the chain, the data can be removed from one gather and provided to another gatherer. For example, data discarded by a first gatherer can be provided to a second or next gatherer. After a subsequent gatherer generates a model, the data can then be removed or transferred, and so on.

Figure 7:
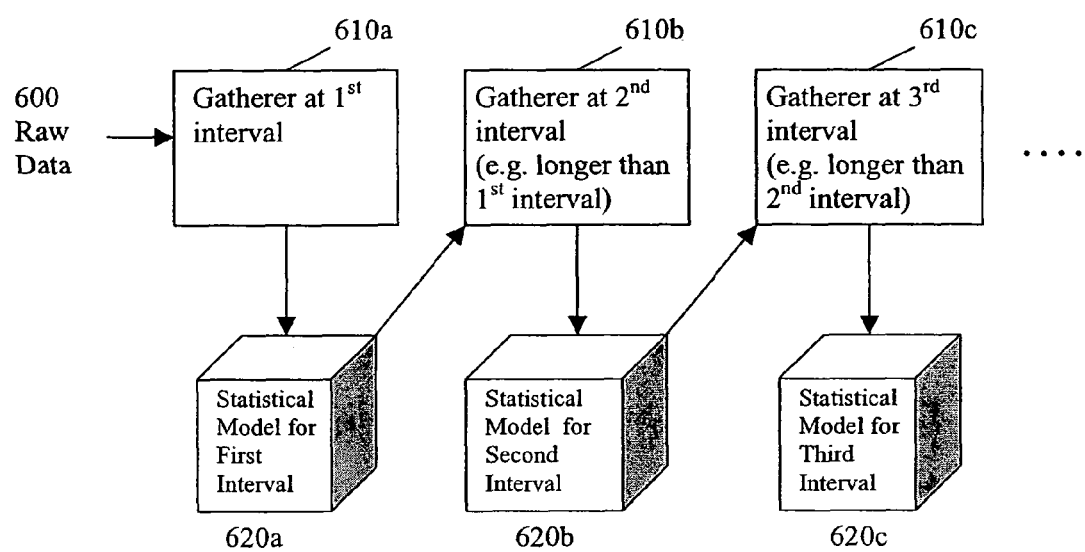
FIG. 7 illustrates a chain of gatherers that gather data at different intervals according to one embodiment.
Figure 8:
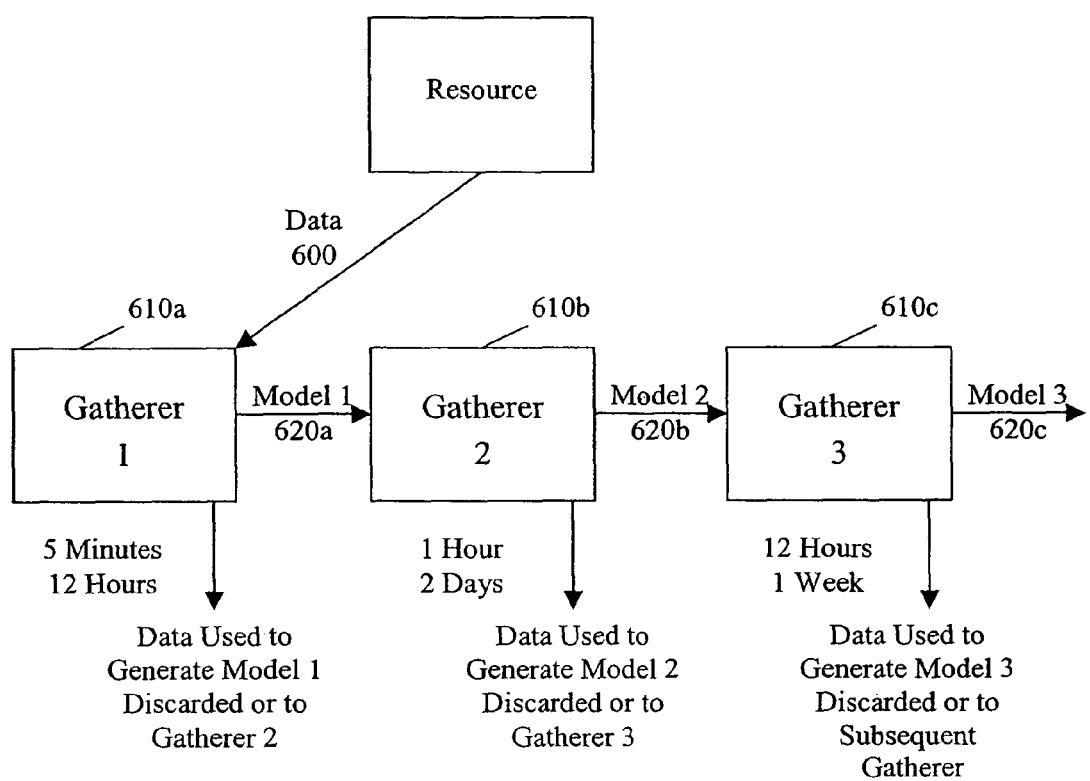
FIG. 8 further illustrates a chain of gatherers and resource data being collected by a first gatherer according to one embodiment.

Referring to FIGS. 7 and 8, a statistical model generated by one gatherer is provided to another gatherer. FIGS. 7 and 8 illustrate three gatherers for purpose of illustration, but any number of gatherers may concurrently exist in the grid system, and each gatherer can gather data for different intervals and for different periods of time. First and second gatherers are associated with each other, and second and third gatherers are associated with each other. The first gatherer 700 receives raw data and generates a first statistical model 620 based on intervals of a first time during a first period. The first model is provided to a second gatherer. The second gatherer generates a second statistical model or updates an existing model based on the first model received from the first gatherer. The second statistical model generated by the second gatherer is provided to the third gatherer, which generates a third statistical model or updates an existing model based on the model received from the second gatherer, and so on for additional gatherers.

In one embodiment, a first gatherer generates a first statistical model in five-minute intervals for a 12 hour period of time. A second gatherer mechanism associated with the first gatherer mechanism can gather data during larger time intervals, e.g., one hour intervals, with that information saved for up to two days. Thus, the second gatherer receives the first model in five minute intervals and formats or compresses that model to represent data in one hour intervals. A third gatherer associated with the second gatherer can gather data during even larger time intervals, e.g., 12 hour intervals, and save that information a week. Thus, the third gatherer receives the second model in one hour intervals and formats or compresses that model to represent data in 12 hour intervals. This may continue upward in intervals indefinitely. In the illustrated embodiment, collection intervals and periods for one gatherer are longer than a collection interval and period for a preceding gatherer. Persons skilled in the art will appreciate that other intervals and periods can be utilized.

Figure 9:
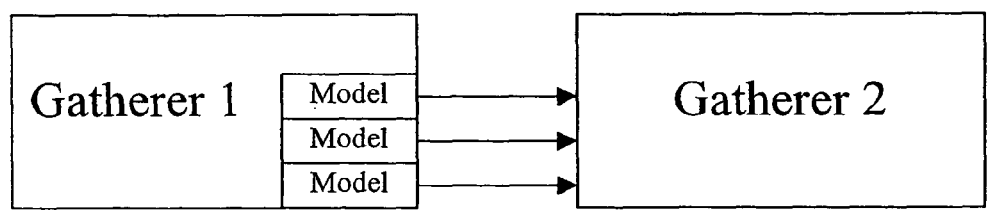
FIG. 9 illustrates different numbers of models being provided from one gatherer to another gatherer according to one embodiment.
Figure 10:
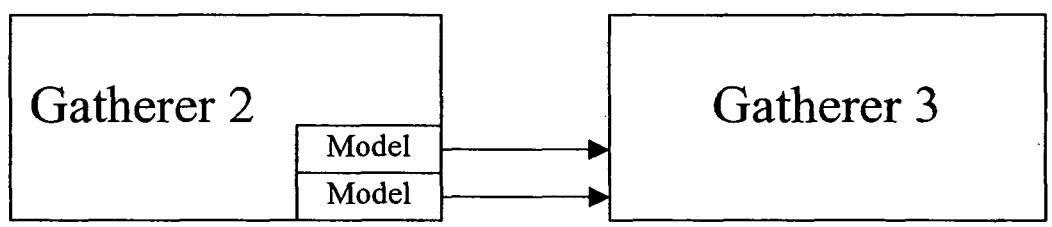
FIG. 10 illustrates different numbers of models being provided from one gatherer to another gatherer according to another embodiment.

Referring to FIGS. 9 and 10, a subsequent gatherer can obtain different numbers of statistical models from a prior gatherer. For example, a gather can acquire one model, two models (as shown in FIG. 9)), three models (as shown in FIG. 10), and other numbers of models. Thus, FIGS. (9 and 10) are provided for purposes of illustration, not limitation.

As a result, gatherer mechanisms can advantageously be configured to produce and collect statistical information for different intervals of time. A common set of resource information may be specified for each level of the gatherer hierarchy. This provides a lowest common denominator set of resources and resource information that can be consistently integrated into each upward gatherer model. This configuration of gatherers allows a system manager to view resource data within different timeframes to provide a better indication of resource trends.

In the illustrated embodiment, gatherers with shorter time intervals have their data collected and models fed into gatherers with larger time intervals. Therefore, each gatherer associated with a larger time interval takes the statistical model from the previous gatherer associated with a smaller time interval. It will then use that statistical model information from the previous gatherer to update its own statistical model. In this manner, the system can maintain years of information for the grid without significantly growing the size of the database once it reaches a certain size. Thus, the amount of raw data that needs to be maintained can be reduced compared to known systems, since the significance of the raw data is encapsulated into each of the succeeding layers of the models produced by the gatherer mechanisms. Further, system managers can analyze resource statistics over both short periods of time and long periods of time.

Figure 11:
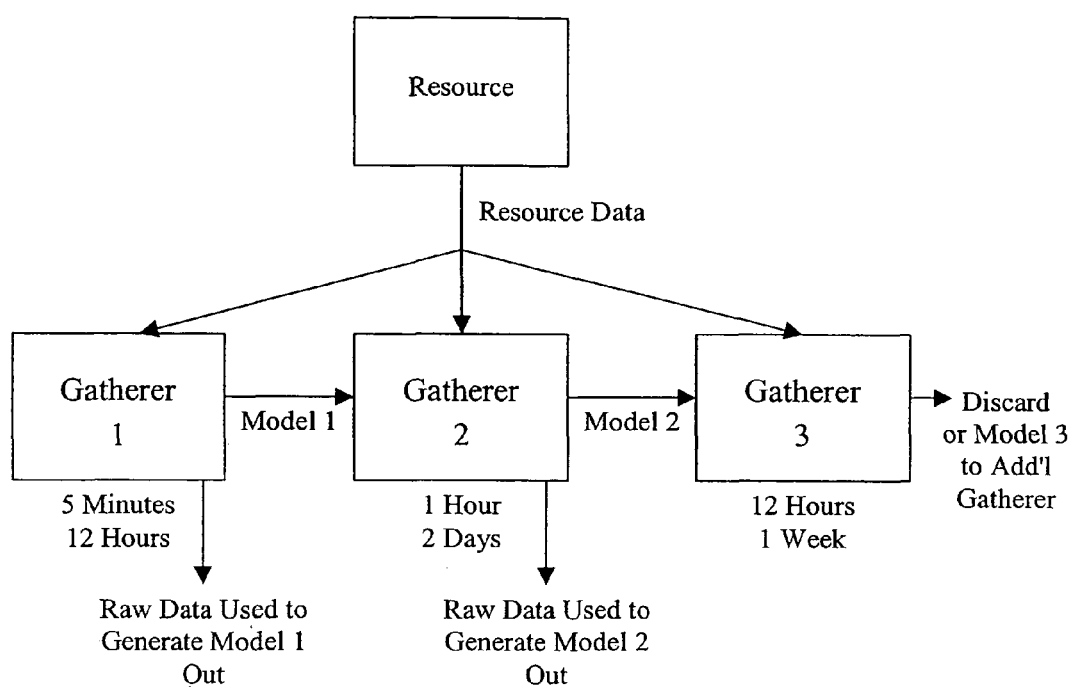
FIG. 11 illustrates a chain of gatherers in which each gatherer receives data and statistical models are provided from one gatherer to another gatherer; according to one embodiment.

A statistical model acquired from a prior gatherer can be used to generate or update a model of a current gatherer in different ways. For example, an acquired model can be the first model provided to a gatherer, integrated into an existing model, or integrated into an existing combination of models. Referring to FIG. 11, for example, an existing model can be generated based on gatherers receiving resource data and generating their own models. For purposes of illustration and explanation, this specification refers to a statistical model being used to update an existing model.

For example, a model generated by a first gatherer is provided to the second gatherer. The model can be the second gatherer's first model. The second gatherer receives the first model in intervals of a first time and formats or compresses that model to represent data in intervals of a second time. Subsequent models received from the first gatherer can then be formatted or compressed to update the second gatherer's model. Alternatively, the second gather may have an existing model, and the model from the first gatherer can be compressed or formatted to update that existing model, in which case the updated statistical model of the second gatherer represents the combination of the first statistical model from the first gatherer and the existing statistical model of the second gatherer.

Similarly, a statistical model generated by the second gatherer is provided to the third gatherer. The model can be the third gatherer's first model. The third gatherer receives the model from the second gatherer in intervals of a second time and formats or compresses that model to represent data in intervals of a third time during a third period. Subsequent models received from the second gatherer can then be used to update that model, and the updated statistical model represents the combination of models received from the second gatherer. Alternatively, the third gather may have an existing model, and that model from the first gatherer is used to update that existing model, in which case the updated statistical model of the second gatherer represents the combination of the first statistical model from the first gatherer and the existing statistical model of the second gatherer.

The combination of statistical models can be executed using various know mathematical and statistical analyses, and the process can be repeated for additional gatherers so that the statistical model generated by a third gatherer is based on a model generated by a second gatherer, a model generated by a fourth gatherer is based on a model generated by a third gatherer, and so on. Thus, gatherers can generate models that represent data over longer periods of time so that trend lines representing different timeframes can be generated and analyzed by system managers.

Figure 12:
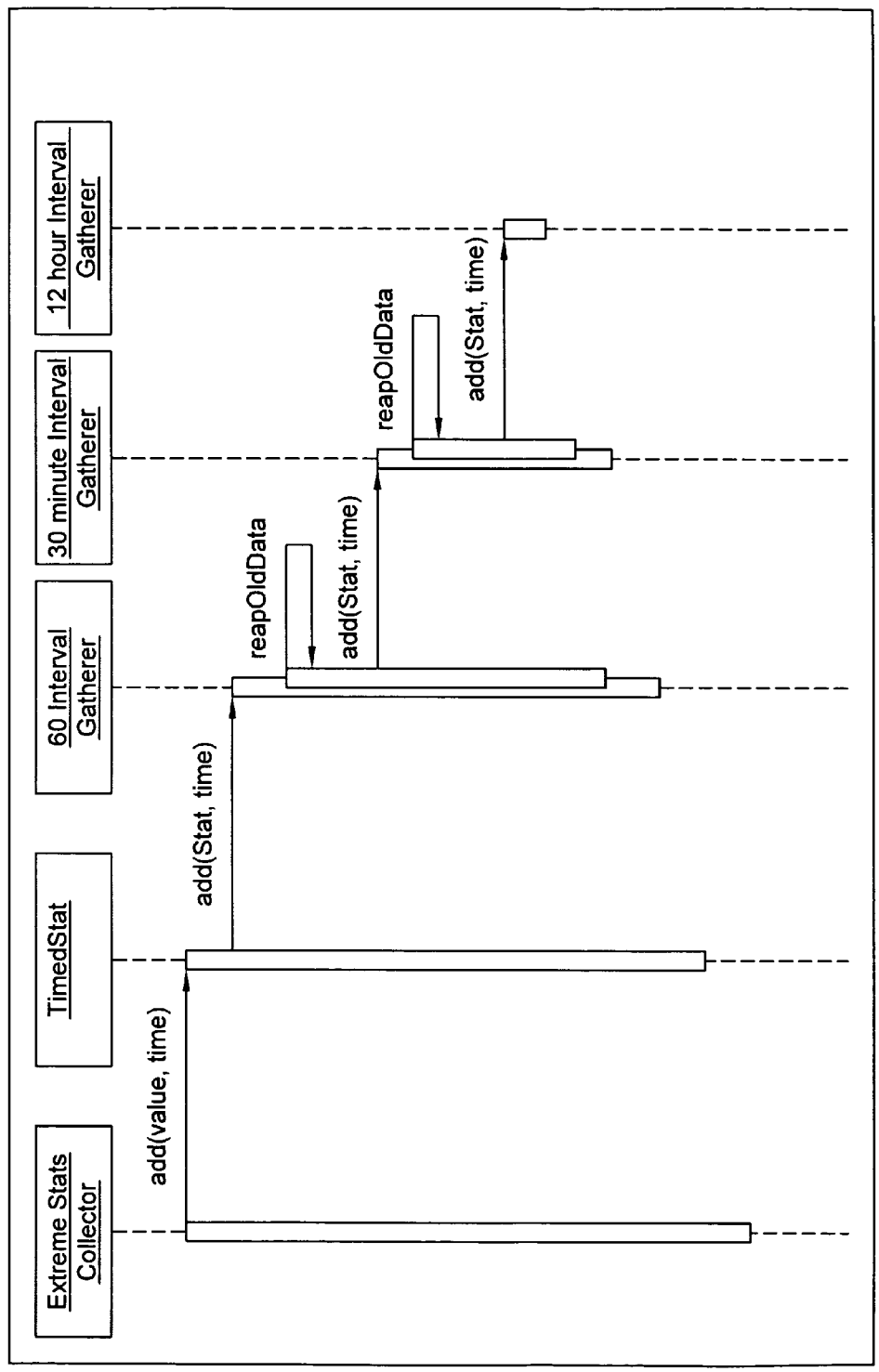
FIG. 12 further illustrates gatherers that collect data in different intervals.
Figure 13:
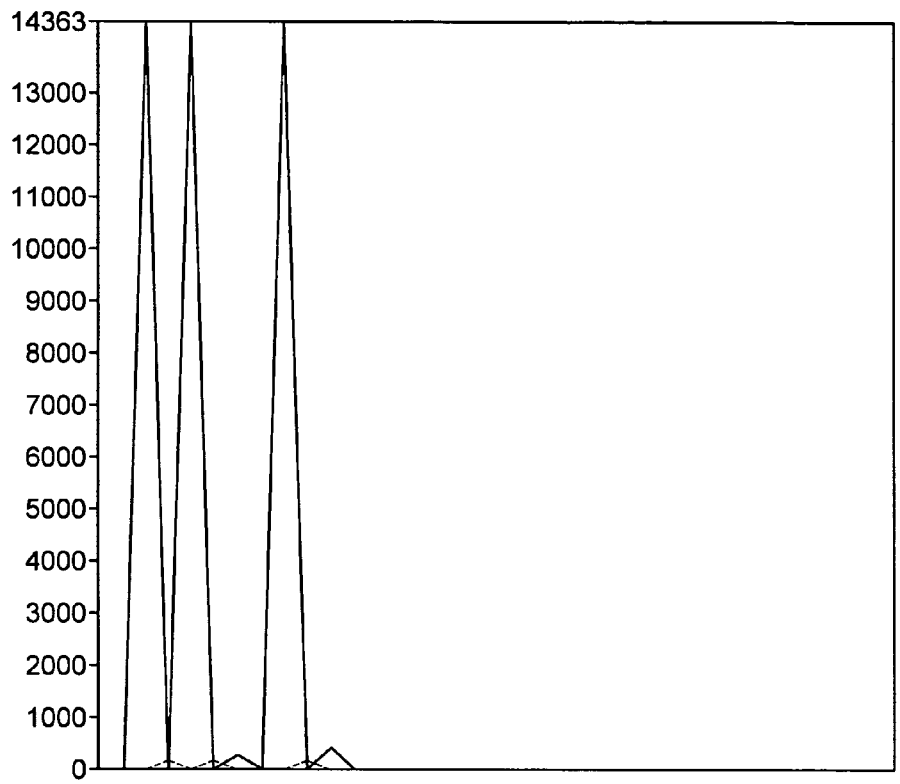
FIG. 13 is a graph illustrating a statistical model that is stored and presented to a user according to one embodiment.
Figure 14:
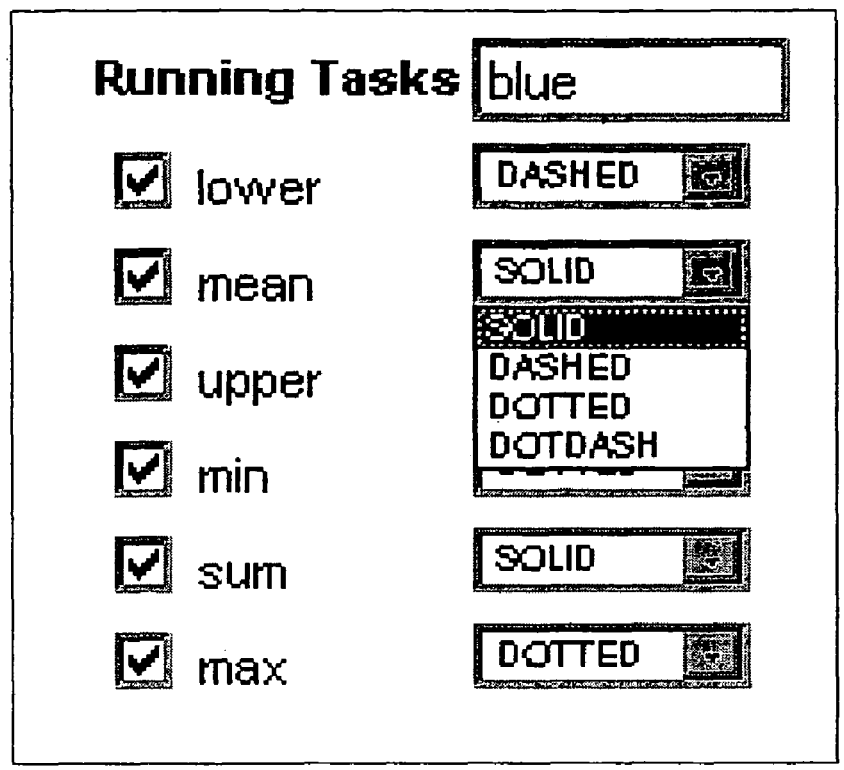
FIG. 14 illustrates one manner of selecting model statistics that are to be displayed to a user.

FIGS. 12-14 illustrate one exemplary implementation of a chain of gatherers that gather data into different intervals for different periods of time. Referring to FIG. 13, each gatherer has an interval within which data is stored. The maximum amount of time that the gatherer will store data is referred to as an "upper" point. When data is above the "upper" point, the data is cleared from that gatherer and passed onto the next gatherer (if available). Otherwise, the data is discarded if there are no subsequent gatherers.

FIG. 12 illustrates how a chain of gatherers functions. In the call reapOldData, values that the user provides in a GRS/Config.pm file can be used to remove data that is older than the "upper" value for the gatherer. That data can be passed on to the next gatherer in the chain. In one embodiment, a 60 second gatherer passes removed data to a 30 minute gatherer, and a 30 minute gatherer passes data to a 12 hour gatherer.

Statistical models can be displayed and viewed by a user. Specifically, the grid reporting system displays statistical models, not raw data, and a user can show different characteristics of the statistical model, including, but not limited to, a sum, a sum of squares, an average, a maximum value, a minimum value, a number of values, a mean, a standard deviation, one standard deviation above a mean, or one standard deviation below a mean. In alternative embodiments, other convenient statistical information can be presented to the user.

Referring to FIG. 13, a grid reporting system allows a user to view the information in several different standard modes. As shown in FIG. 13, a first mode shows the min, lower, mean, upper, and max of gathered information. In the illustrated embodiment, the min and max values are represented by dotted lines, the lower and upper are represented by dashed lines, and the mean is a solid line.

Referring to FIG. 14, users can select specific statistical characteristics that are to be displayed. Users can also change the line type that is shown in the graph for the specific characteristics and/or select alternate statistical data to be viewed.

Figure 15:
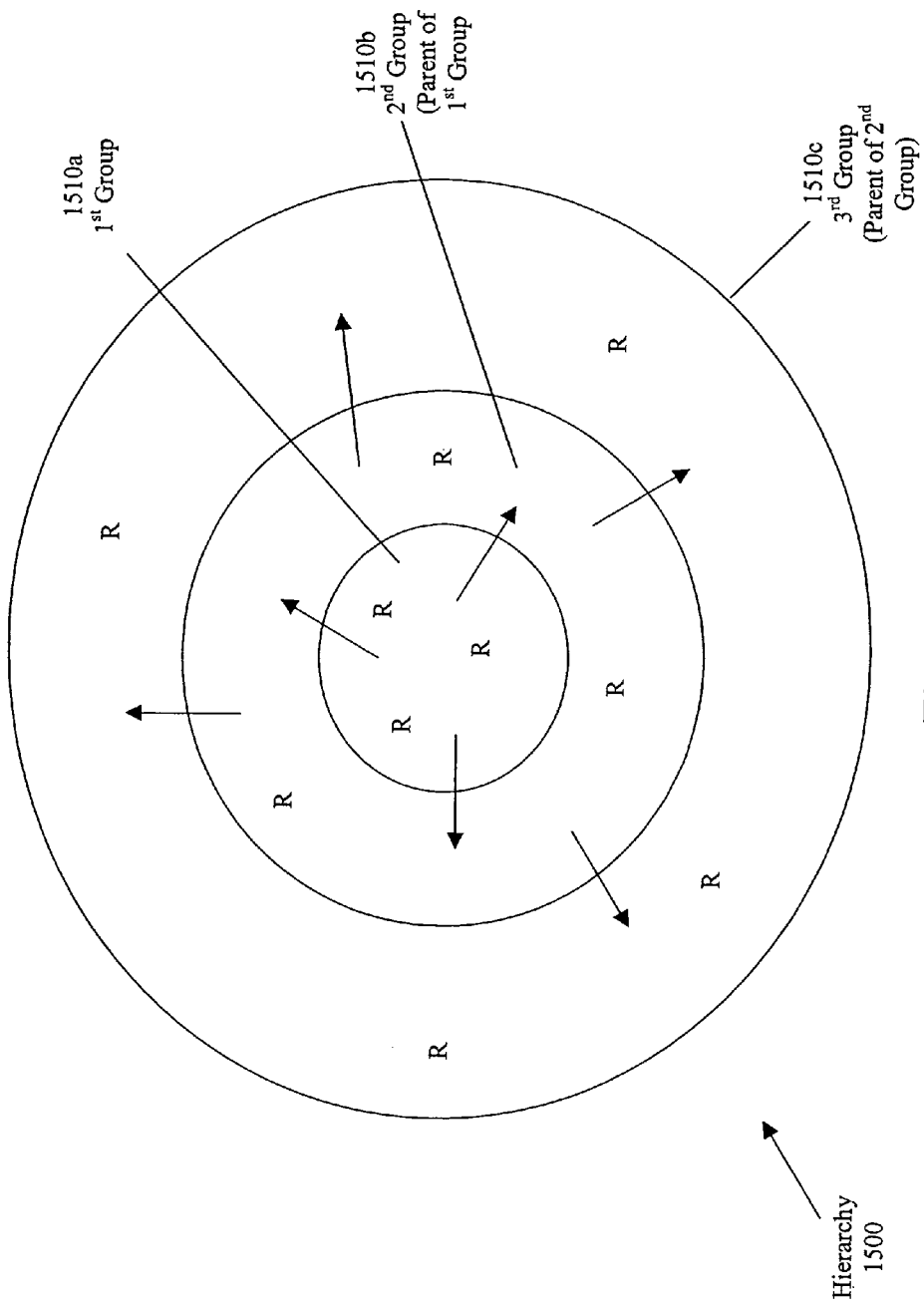
FIG. 15 illustrates propagating resource models to various groups of resources in a distributed computing grid according to one embodiment.

Referring to FIG. 15, according to an alternative embodiment, resources can be grouped together into groups, such as particular types of devices on the grid, a common operating system or location. The gathering systems and methods described above can be applied to propagate statistical information to different groups or levels of groups in a hierarchy of groups. Thus, statistics can be gathered and stored in time (as described above) and, in addition, gathered and stored in terms of hierarchy or other spatial relationships.

FIG. 15 illustrates three groups of resources (identified as "R") in a hierarchy of groups. A first group includes a number of resources, a second group includes a number of resources and includes the first group as a child, and the third group includes a number of resources and includes the second group as a child and the first group as a grandchild. Resource information from one group can be propagated to one or more higher groups in the hierarchy. Instead of looking at individual resources, the system can look at collected groups of resources. When a particular group is analyzed, a statistical model of all the individual resources and statistics can also be viewed.

Figure 16:
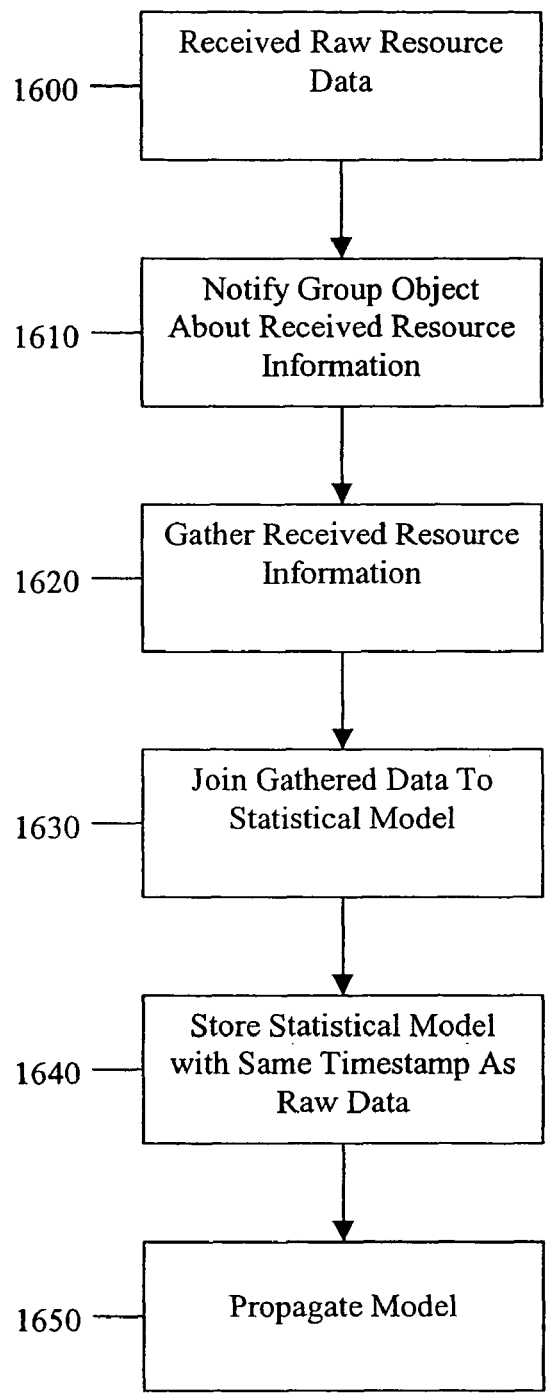
FIG. 16 is a flow chart illustrating a method of propagating hierarchical statistical data to other resource groups in a grid according to one embodiment.

Referring to FIG. 16, initially in step 1600, raw data that is associated with a resource is received. The resource may be associated with a particular group. In step 1610, a group object that is associated with the group is notified that a new statistic about the resources has been received, e.g., a statistic relating to a name, values, time it was collected, etc. In step 1620, the received data is gathered, as described above. In step 1630, the received data is joined to a statistical model for all the other resources in that group, e.g., by time. In step 1640, once the data is gathered from members of the group (children resources), for the resources belonging to that group, a statistical model is generated and stored based on the same time stamp or period as the received raw data. In step 1650, the object or mechanism that passes information from a resource to a group, can also pass information from a first group up to a second group, e.g., a supergroup, ad infinitum, all the way to the very top of the database. This statistical data propagation can happen through the whole hierarchy in the grid reporting system so that a user can go at any group level and see information at that group level.

Therefore, instead of just storing individual raw data, a statistical model is stored of the raw data for the group's resources for that time stamp or period, and statistical models can be propagated throughout different levels of a database.

Figure 17:
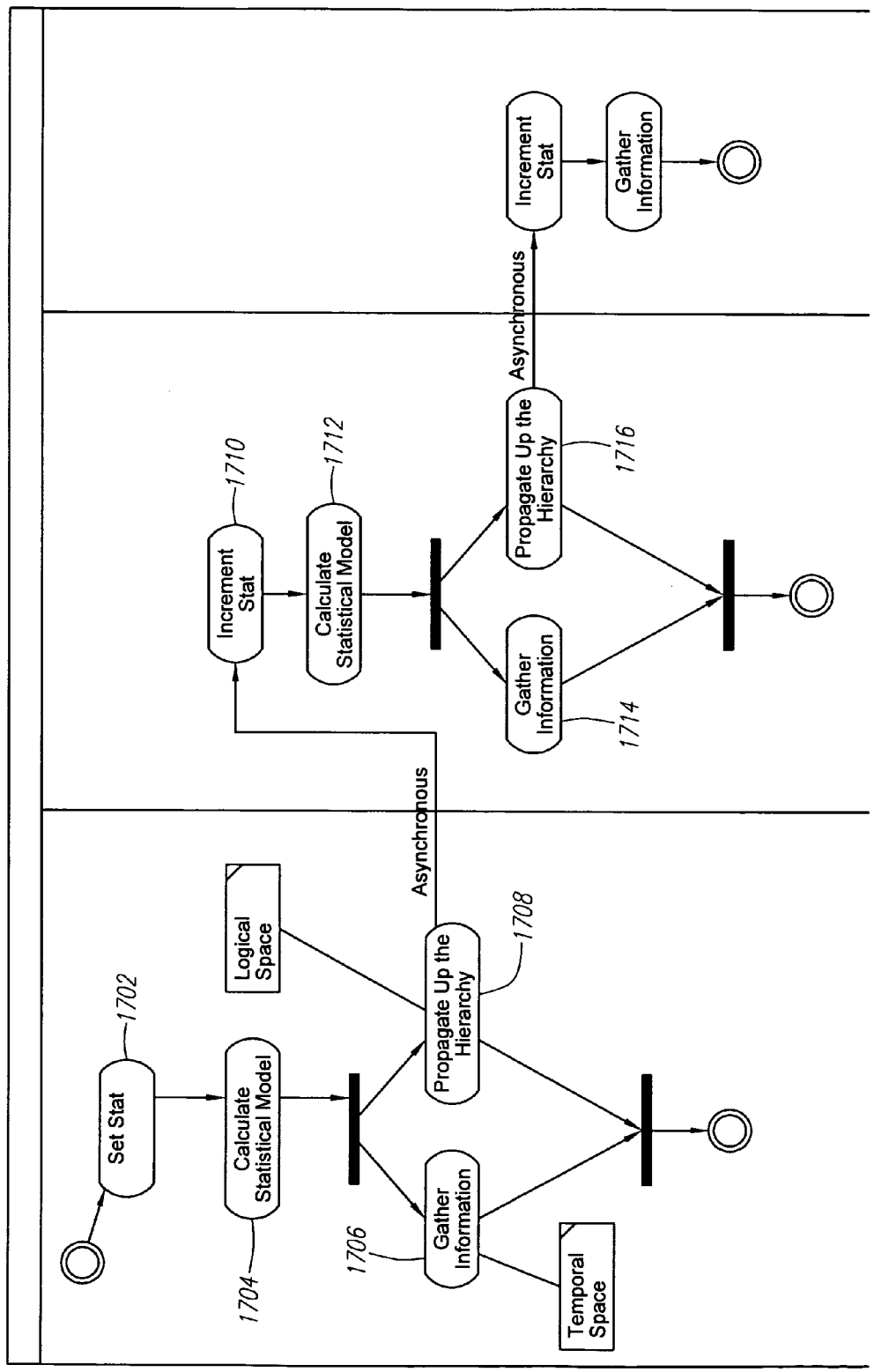
FIG. 17 is a flow chart illustrating a method of propagating hierarchical statistical data to other resource groups in a grid in further detail according to one embodiment.

More specifically, referring to FIG. 17, at step 1702, a first level within the system receives a statistical update, which it then is called Set_Stat 1702. The system than then calculate statistical models 1704 based on the statistical update. In one embodiment the statistical models can be Number of Elements, Maximum, Minimum, Sum, Sum of Squares and Average. However, any convenient statistical information can be calculated and stored.

In the embodiment shown in FIG. 17, the system can concurrently gather new information regarding the system resources 1706 and propagate the statistical information up the hierarchy 1708. In one embodiment, the gathering of additional resource information can be conducted as described above. In alternate embodiments, additional information related to the resources can be gathered in other manners.

From the Propagate up the Hierarchy step 1708, the system can make an asynchronous call to a higher level in the system by calling Increment_Stat 1710. The system can next calculate a statistical model 1712 based on an existing statistical model and the new statistical information calculated in step 1704. The statistical model can include, for example, an aggregate Number of Elements, Maximum, Minimum, Sum, Sum of Squares and Average.

In one embodiment, a standard deviation can be determined based on the following formula:

$$Nstdev = Nsum^2 / Nnum$$

where
$Nsum^2 = Esum^2 + (Imean - Nmean) * (Imean - Emean)$
and where
$Nnum = Enum + Inum$
and where
Esum=currently known sum from previous statistical data
Enum=currently known number of elements from previous statistical data
$Esum^2$=sum of the squares known from the previous statistical data
Emean=mean known from the previous statistical data
Isum=sum from the newly received data
Inum=number of elements from the newly received data
Imean=mean from the newly received data
Nmean=Mean of the combination of the known previous statistical data and the newly received data.

The statistical combination of new data and existing statistical data can also be performed in any known manner.

The system can then do the same thing that the child did—gather information in temporal space 1714, and create the statistic model in temporal space, and then propagate resource information up the hierarchy 1716 until it reaches a predetermined point within the hierarchy.

In one embodiment, communication of the data can be conducted asynchronously. However in alternate embodiments, this can be a synchronous communication.

Figure 18:
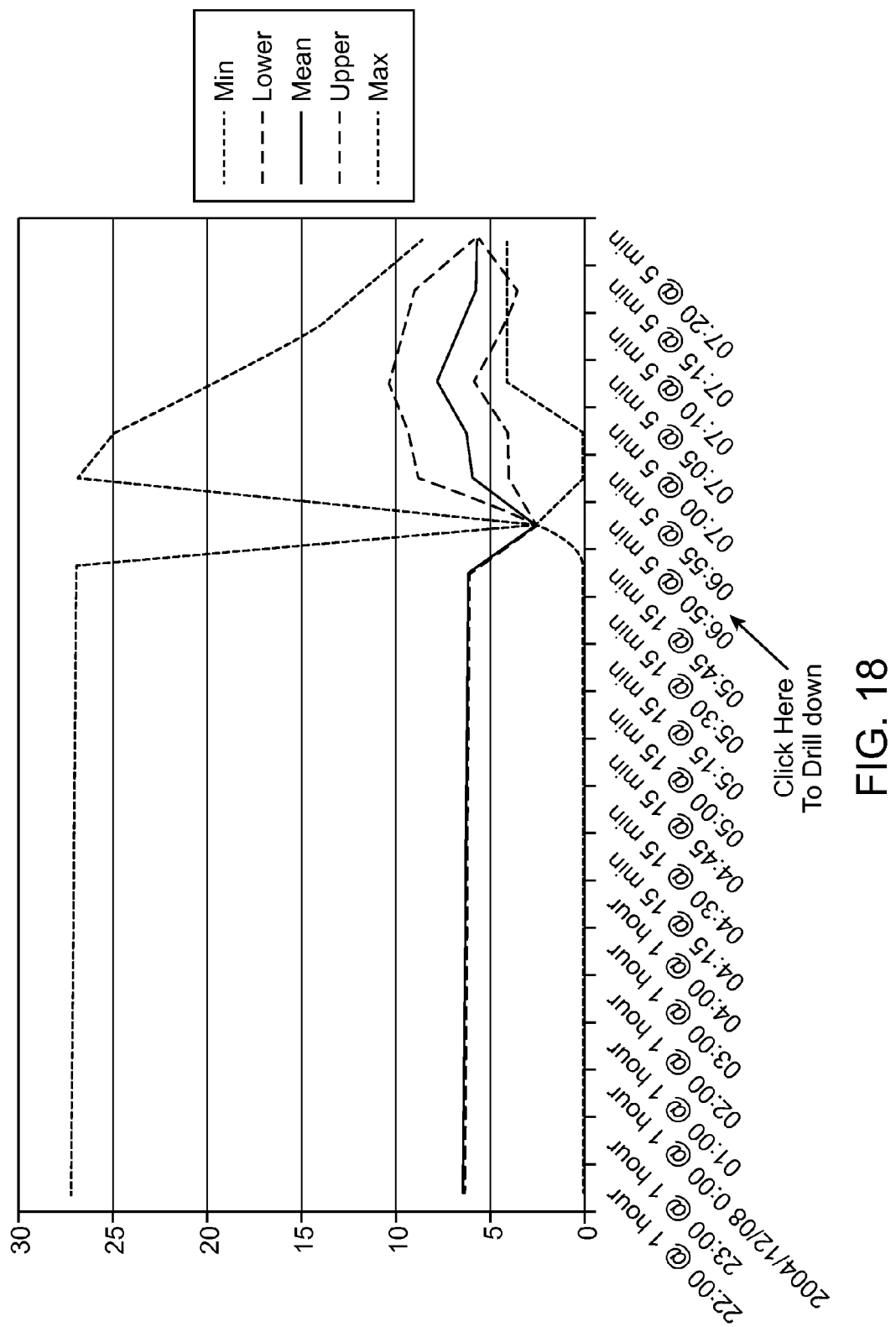
FIG. 18 is a graph illustrating a statistical model for one resource statistic of a site.

FIG. 18 shows a statistical model for one resource statistic for the complete site. A site can have several clusters and a cluster can have several hosts. The site graphical shown in FIG. 18 provides a temporal view using gathered statistical information as data sets. Thus, the system can show large amounts of temporal data in a very compact and easy to read format. It also gives the user the ability to view more detailed statistical information on a specific date/time/interval and see what factors or elements contributed to the calculated value. For example, if a user clicks on a date/time/interval, then the underlying objects' statistical models for that date/time/interval can be shown, as in FIG. 19.

Figure 19:
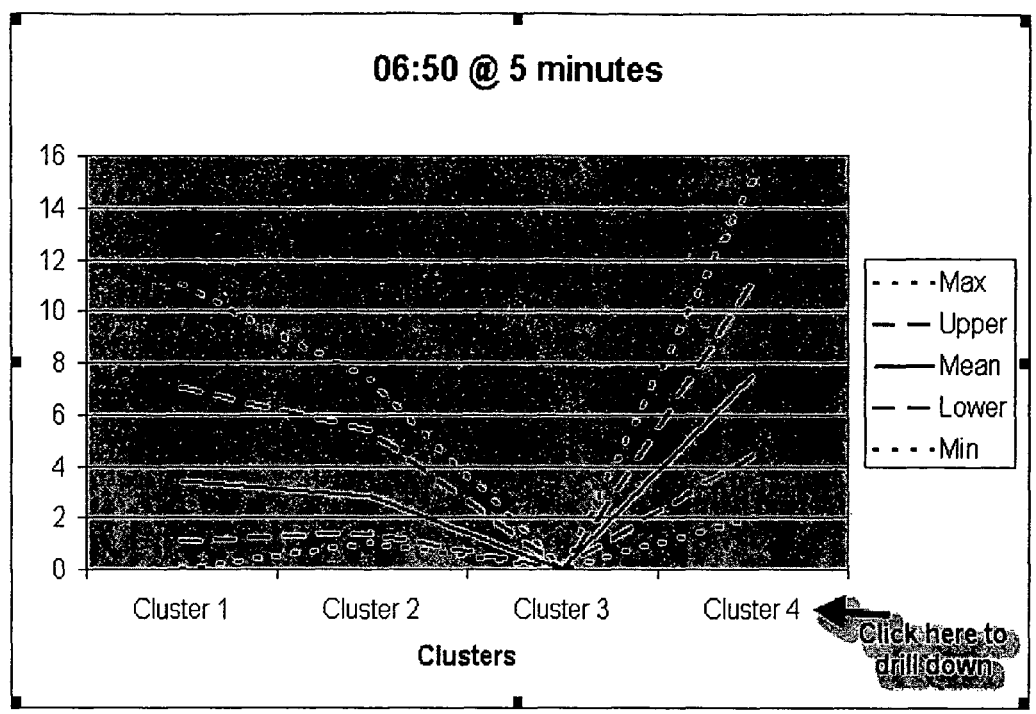
FIG. 19 is a graph illustrates statistics of clusters on a site at a particular time.

FIG. 19 shows a single time slice, defined by a gatherer, for all of the clusters on a site. The graphical representation allows a user to determine activity on all of the clusters at the time in question. By clicking on a point of the graphic in FIG. 19, a user can view the full temporal space for an individual cluster by clicking on the cluster name. This will then cause the graphic shown in FIG. 20 to be displayed, which shows the complete temporal space of the resource statistic in question.

Figure 20:
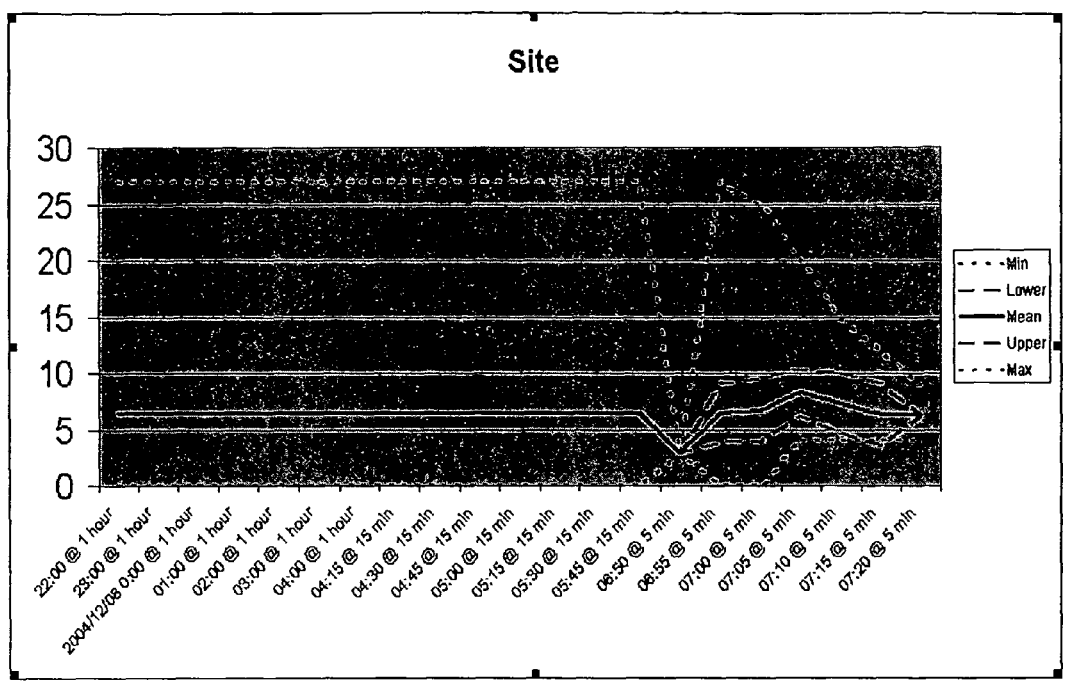
FIG. 20 is a graph illustrating a complete temporal space of a resource statistic.

In the embodiment shown in FIGS. 18-20, the diagrams show one resource statistic—the Running Tasks statistic. In alternate embodiments, multiple statistics can be shown on the same graphs using various colors and/or differentiating features. Additional hierarchical statistical data can also be shown depending on the hierarchy of the database and the information stored.

An interface feature of one embodiment provides an approach for presenting information to the user that allows him to look at historical information in one simple screen, without all the raw data, but looking at the statistical model. This interface shows the oldest gatherer first and moves to the youngest, so that the user can see the trend lines moving, even though the oldest data has statistically been compressed quite a bit.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

What is claimed:

1. A method of gathering and propagating statistical information about resources in a distributed computing grid, comprising:

receiving data, at a first resource in a first group of resources, relating to the first resource in the first group of resources on the distributed computing grid;

providing the data to a second resource in a second group, wherein the act of providing the data comprises propagating the data to the second resource in the second group and discarding the data at the first resource in the first group;

determining a first statistical model for the first resource in the first group based at least in part on the data that are received at the first resource, wherein the statistical model represents a characteristic of the distributed computing grid observed at the first resource at a first time interval; and determining, at the second resource, a third statistical model of the data by reducing a size of the data that are propagated from the first resource to the second resource into the statistical model;

determining, by using at least one processor, a second statistical model of the second resource in the second group of resources based at least in part on the third statistical model rather than from the data that are propagated from the first resource to the second resources, wherein the second statistical model represents the characteristic of the distributed computing grid observed at the second resource at a second time interval.

2. The method of claim 1, wherein the second statistical model of the second resource in the second group represents a combination of the first statistical model of the first resource in the first group and one or more newly determined statistical models of one or more resource in the second group.

3. The method of claim 1, the act of receiving data relating to the first resource in the first group of resources comprising receiving raw or original data.

4. The method of claim 1, wherein providing the data to a second resource in the second group further comprises:
notifying an object of the first group that data relating to the first resource in the first group has been received; and
providing the data to the second resource in the second group using the object.

5. The method of claim 1, wherein the second group is identified or determined synchronously.

6. The method of claim 1, wherein the second group is identified or determined asynchronously.

7. The method of claim 1, wherein the second statistical model of the second resource in the second group represents a sum, a sum of squares, an average, a maximum value, a minimum value, a number of values, a mean, one standard deviation above a mean, or one standard deviation below a mean.

8. The method of claim 1, wherein the second statistical model of the second resource in the second group represents a standard deviation.

9. The method of claim 1, wherein the second statistical model of the second resource in the second group is based at least in part on received data having the same timestamp.

10. The method of claim 1, wherein the second group is hierarchically above the first group in a hierarchy of the distributed computing grid.

11. The method of claim 10, wherein the second group is a parent to the first group in the hierarchy.

12. The method of claim 10, wherein the second group is a top group at the highest hierarchical level in the hierarchy.

13. The method of claim 10, wherein the second group is an intermediate group in the hierarchy.

14. The method of claim 10, wherein the second group is a supergroup of resources, and the first group of resources is a child or group of the supergroup in the hierarchy.

15. The method of claim 1, further comprising propagating the second statistical model of the second resource of the second group to one or more other groups of resources on the distributed computing grid.

16. The method of claim 15, further comprising
calling a third group of resources on the distributed computing grid;
determining a third statistical model of a third resource in the third group; and
determining a third statistical model of the third resource in the third group of resources based at least in part on the second statistical model of the second resource in the second group.

17. The method of claim 16, wherein the third group is the top group at the highest hierarchical level in a hierarchy of the distributed computing grid.

18. The method of claim 16, wherein the third group is an intermediate group in a hierarchy of the distributed computing grid.

19. The computer implemented method of claim 1, wherein the second group is located at a higher hierarchical level than the first group on the distributed computing network.

20. The computer implemented method of claim 1, wherein the second statistical model of the second resource in the second group comprises a combination of a plurality of the statistical models of a plurality of resources in the first group of resources.

21. The computer implemented method of claim 1, wherein the act of providing the data to the second resource in the second group comprises:
adjusting the data received at the first resource in the first group based at least in part upon the first time interval and the second time interval.

22. The computer implemented method of claim 1, wherein the act of providing the data to the second resource in the second group comprises:
discarding the data propagated to the second resource in the second group.

23. A system for gathering and propagating statistical information about resources in a distributed computing grid, comprising:
at least one processor that is programmed for performing a process, the process comprising:
receiving data, at a first resource in a first group, relating to the first resource in the first group of resources on the distributed computing grid;
providing the data to a second resource in a second group, wherein the action of providing the data comprises propagating the data to the second resource in the second group and discarding the data at the first resource in the first group;
determining a first statistical model for the first resource in the first group based at least in part on the data that are received, wherein
the first statistical model represents a characteristic of the distributed computing grid observed at the first resource at a first time interval; and
determining, at the second resource, a third statistical model of the data by reducing a size of the data into the statistical model the data that are propagated from the first resource to the second resource;
determining, by using the at least one processor, a second statistical model of the second resource in the second group of resources based at least in part on the third statistical model rather than from the data that are propagated from the first resource to the second resources, wherein
the second statistical model represents a first characteristic of the distributed computing grid observed at the second resource at a second time interval.

24. The system of claim 23, the act of receiving the data relating to the first resource in the first group of resources comprising receiving raw or original data.

25. The system of claim 23, wherein the computer system programmed for performing the action of providing the received data to other resources in the first group is further programmed for performing:
notifying an object of the first group that the data relating to the first resource in the first group has been received; and
providing the data to one or more other resources in the first group using the object.

26. The system of claim 23, wherein the second group is identified or determined synchronously.

27. The system of claim 23, wherein the second group is identified or determined asynchronously.

28. The system of claim 23, wherein the second statistical model of the second resource in the second group is based at least in part on data having the same timestamp.

29. The system of claim 23, wherein the second group is a parent to the first group in a hierarchy.

30. The system of claim 29, wherein the second group is a top group at the highest hierarchical level in the hierarchy.

31. The system of claim 29, wherein the second group is an intermediate group in the hierarchy.

32. The system of claim 29, wherein the second group is a supergroup of resources, and the first group of resources is a child or group of the supergroup in the hierarchy.

33. The system of claim 23, further comprising propagating the second statistical model of the second resource of the second group to one or more other groups of resources on the distributed computing grid.

34. The system of claim 33, the computer system is further programmed for performing:
   calling a third group of resources on the distributed computing grid;
   determining a first statistical model of each resource in the third group; and
   determining a second statistical model of each resource in the third group of resources based on the second statistical model of a resource in the second group.

35. A computer program product comprising a non-transitory computer readable storage medium having stored thereupon a sequence of instructions which, when executed by a processor, causes the processor to execute a process for gathering and propagating statistical information about resources in a distributed computing grid, the process comprising:
   receiving data, at a first resource in a first group of resources, relating to the first resource in the first group of resources on the distributed computing grid; and
   providing the data to a second resource in a second group of resources, wherein the action of providing the data to the second resource comprises propagating the data to the second resource in the second group and discarding the data at the first resource in the first group;
   determining a first statistical model for the first resource in the first group based at least in part on the data that are received at the first resource, wherein
      the statistical model represents a characteristic of the distributed computing grid observed at the first resource at a first time interval; and
   determining, at the second resource, a third statistical model of the data by reducing a size of the data into the statistical model the data that are propagated from the first resource to the second resource;
   determining, by using the processor, a second statistical model of the second resource in the second group of resources based at least in part on the third statistical model rather than from the data that are propagated from the first resource to the second resources, wherein
      the second statistical model represents a first characteristic of the distributed computing grid observed at the second resource at a second time interval.

36. The computer program product of claim 35, wherein the second statistical model represents a combination of the first statistical model of the first resource in the first group and one or more newly determined or identified statistical models of the second resource in the second group.

37. The computer program product of claim 35, wherein the second group is identified asynchronously.

38. The computer program product method of claim 35, wherein the second statistical model of the second resource in the second group is based at least in part on received data having the same timestamp.

39. The computer program product method of claim 35, wherein the second group is a parent to the first group in a hierarchy.

40. The computer program product method of claim 39, wherein the second group is a top group at the highest hierarchical level in the hierarchy.

41. The computer program product method of claim 39, wherein the second group is an intermediate group in the hierarchy.

* * * * *